(12) United States Patent
Kobayashi

(10) Patent No.: US 11,874,004 B2
(45) Date of Patent: Jan. 16, 2024

(54) VENTILATION CONTROL DEVICE AND VENTILATION SYSTEM

(71) Applicant: Panasonic Intellectual Property Management Co., Ltd., Osaka (JP)

(72) Inventor: Kazuyuki Kobayashi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 763 days.

(21) Appl. No.: 16/978,848

(22) PCT Filed: Mar. 11, 2019

(86) PCT No.: PCT/JP2019/009554
§ 371 (c)(1),
(2) Date: Sep. 8, 2020

(87) PCT Pub. No.: WO2019/188156
PCT Pub. Date: Oct. 3, 2019

(65) Prior Publication Data
US 2021/0003302 A1 Jan. 7, 2021

(30) Foreign Application Priority Data
Mar. 26, 2018 (JP) .................................. 2018-057380

(51) Int. Cl.
*F24F 11/00* (2018.01)
*F24F 11/46* (2018.01)
(Continued)

(52) U.S. Cl.
CPC .......... *F24F 11/0001* (2013.01); *F24F 11/46* (2018.01); *F24F 11/64* (2018.01);
(Continued)

(58) Field of Classification Search
CPC ........ F24F 11/0001; F24F 11/46; F24F 11/64; F24F 11/65; F24F 2011/0002;
(Continued)

(56) References Cited

U.S. PATENT DOCUMENTS 7,127,850 B1 * 10/2006 Fex, Jr. ................. F24F 11/0001
52/100
9,500,383 B2 * 11/2016 Jensen ................... F24F 11/745
(Continued)

FOREIGN PATENT DOCUMENTS

| CA | 3011578 A1 | 9/2017 |
|---|---|---|
| CN | 108603682 A | 9/2018 |

(Continued)

OTHER PUBLICATIONS

International Search Report issued in Patent Application No. PCT/JP2019/009554 dated Apr. 16, 2019.

*Primary Examiner* — Ramesh B Patel
(74) *Attorney, Agent, or Firm* — PEARNE & GORDON LLP

(57) ABSTRACT

A ventilation control device (2) includes a total exhaust air volume reader (16), an exhaust device specification reader (17), an exhaust air volume distributor (18), and an exhaust air volume instructor (19). The total exhaust air volume reader (16) reads the total exhaust air volume set to a building. The exhaust device specification reader (17) reads a maximum exhaust air volume of each of exhaust devices (3) as a specification of the exhaust device (3). The exhaust air volume distributor (18) sets the exhaust air volume of each exhaust device (3) by distributing the exhaust air volume read by the total exhaust air volume reader (16) according to the maximum exhaust air volume of the exhaust device (3) read by the exhaust device specification reader (17). The exhaust air volume instructor (19) instructs,
(Continued)

to each exhaust device (3), the exhaust air volume set by the exhaust air volume distributor (18).

16 Claims, 19 Drawing Sheets

(51) Int. Cl.
    *F24F 11/64*     (2018.01)
    *F24F 11/65*     (2018.01)
    *F24F 140/10*     (2018.01)

(52) U.S. Cl.
    CPC ....... *F24F 11/65* (2018.01); *F24F 2011/0002* (2013.01); *F24F 2140/10* (2018.01)

(58) Field of Classification Search
    CPC ........ F24F 2140/10; F24F 11/58; F24F 11/63; F24F 11/56; F24F 11/77; Y02B 30/70
    See application file for complete search history.

(56) References Cited

U.S. PATENT DOCUMENTS

| | | | | |
|---|---|---|---|---|
| 10,670,285 B2* | 6/2020 | Subban | .................. | F24F 3/0442 |
| 10,782,042 B2* | 9/2020 | Funada | ................ | F24F 11/0001 |
| 11,156,176 B2* | 10/2021 | Ulrey | ........................ | F01N 3/10 |
| 2004/0185770 A1* | 9/2004 | Soeholm | ................. | F23N 5/203 |
| | | | | 454/239 |
| 2007/0032187 A1* | 2/2007 | Liu | ...................... | F24F 11/0001 |
| | | | | 454/186 |
| 2008/0179408 A1* | 7/2008 | Seem | .................. | G05B 13/042 |
| | | | | 236/13 |
| 2010/0048123 A1* | 2/2010 | O'Gorman | ............... | F24F 11/46 |
| | | | | 236/44 C |
| 2014/0099872 A1* | 4/2014 | Matsumoto | .............. | F24F 11/76 |
| | | | | 454/229 |
| 2018/0306456 A1* | 10/2018 | Subban | ................ | F24F 3/0442 |
| 2019/0024929 A1* | 1/2019 | Funada | .................... | F24F 11/89 |
| 2021/0003302 A1* | 1/2021 | Kobayashi | ............... | F24F 11/77 |

FOREIGN PATENT DOCUMENTS

| | | |
|---|---|---|
| JP | H05-018573 A | 1/1993 |
| JP | 2004-301349 A | 10/2004 |
| JP | 2016-008794 A | 1/2016 |
| KR | 2012-0106196 A | 9/2012 |
| WO | 2017/159208 A1 | 9/2017 |

\* cited by examiner

US 11,874,004 B2

VENTILATION CONTROL DEVICE AND VENTILATION SYSTEM

TECHNICAL FIELD

The present disclosure relates to a ventilation control device and a ventilation system.

BACKGROUND ART

A ventilation system is known which is constructed for a building, such as housing, which includes a plurality of exhaust devices capable of delivering air from the inside to the outside of the building and a plurality of air supply devices capable of delivering air from the outside to the inside of the building, and which provides 24-hour ventilation (see, for example, Patent Literature (PTL) 1).

In some such ventilation systems, the volume of air to be exhausted (exhaust air volume) or the volume of air to be supplied (air supply volume) can be individually set to each exhaust device or each air supply device such that ventilation is performed with the volume of air to be ventilated (ventilation air volume) required for the building for which the ventilation system is constructed. In this type of conventional ventilation system, a builder, a building constructor, etc. of a building determines the exhaust air volume or the air supply volume to be assigned to each exhaust device and each air supply device, and individually sets the exhaust air volume to each exhaust device or the air supply volume to each air supply device.

CITATION LIST

Patent Literature

PTL 1: Japanese Unexamined Patent Application Publication No. 2016-8794

SUMMARY (SUMMARY OF THE INVENTION)

However, in the method of setting the exhaust air volume to each exhaust device or the air supply volume to each air supply device in the conventional ventilation system, there is a concern that the exhaust air volume or the air supply volume is not necessarily set in a balanced manner according to the capacity of each exhaust device and each air supply device. In other words, in the conventional ventilation system, a large exhaust air volume or a large air supply volume is preferentially set to some exhaust devices or air supply devices, which might lead to wasteful energy consumption.

The present disclosure has been conceived to solve the above problem. An object of the present disclosure is to provide a ventilation control device which allows energy-saving operation of a ventilation system and a ventilation system including the ventilation control device.

In order to achieve the above object, the ventilation control device according to the present disclosure is communicatively connected to a plurality of exhaust devices installed in a building. The ventilation control device controls an operation of each of the exhaust devices capable of delivering air from the inside to the outside of the building. The ventilation control device includes a total exhaust air volume reader, an exhaust device specification reader, an exhaust air volume distributor, and an exhaust air volume instructor. The total exhaust air volume reader reads the total exhaust air volume set to the building. The exhaust device specification reader reads the maximum exhaust air volume of each of the exhaust devices as a specification of the exhaust device. The exhaust air volume distributor sets the exhaust air volume of each exhaust device by distributing the exhaust air volume read by the total exhaust air volume reader according to the maximum exhaust air volume of the exhaust device read by the exhaust device specification reader. The exhaust air volume instructor instructs, to each exhaust device, the exhaust air volume set by the exhaust air volume distributor.

Moreover, the ventilation system according to the present disclosure includes: a plurality of exhaust devices installed in a building and capable of delivering air from the inside to the outside of the building; a plurality of air supply devices installed in the building and capable of delivering air from the outside to the inside of the building; and a ventilation control device communicatively connected to the exhaust devices and the air supply devices.

According to the ventilation control device and the ventilation system in the present disclosure, the exhaust air volume of each exhaust device is set by distributing the total exhaust air volume set to a building according to the maximum exhaust air volume of the exhaust device. Hence, the exhaust air volume is set in a balanced manner according to the capacity of each exhaust device. Accordingly, energy saving operation of the ventilation system can be achieved.

DESCRIPTION OF EMBODIMENTS

Figure 1:
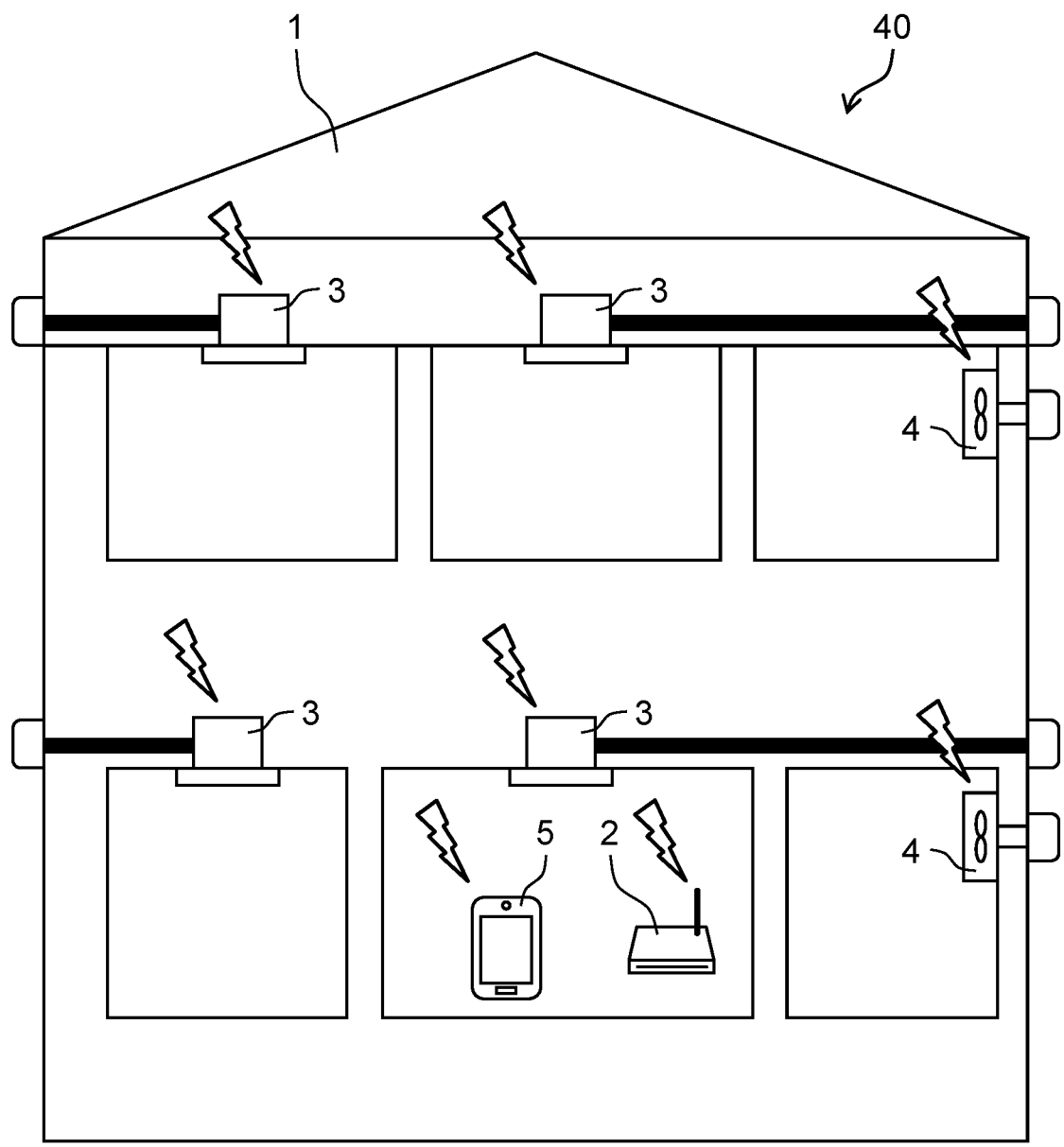
FIG. 1 is a schematic diagram of connection of a ventilation system according to a first embodiment of the present disclosure.

Hereinafter, embodiments for carrying out the present disclosure will be described with reference to the accompanying drawings. Note that each of the embodiments described below shows a preferred specific example of the present disclosure. Therefore, numerical values, shapes, materials, structural elements, arrangement positions and connection forms of the structural elements, steps (processes), order of the steps, and the like shown in the following embodiments are examples, and are not intended to limit the present disclosure. Hence, among the structural elements in the following embodiments, structural elements that are not described in the independent claims showing the highest concept of the present disclosure are described as optional structural elements. Additionally, like reference signs indicate like structural elements in the drawings, and overlapping descriptions thereof are omitted or simplified.

First Embodiment

First, ventilation control device 2 and ventilation system 40 according to a first embodiment of the present disclosure will be described with reference to FIG. 1. FIG. 1 is a schematic diagram of connection of ventilation system 40 according to the first embodiment.

Ventilation system 40 includes ventilation control device 2, a plurality of exhaust devices 3, a plurality of air supply devices 4, and input and output terminal 5.

Ventilation control device 2 is disposed in general housing 1 which is an example of a building. Ventilation control device 2 is communicatively connected to exhaust devices 3 and air supply devices 4 via wireless communication to control the operations of exhaust devices 3 and air supply devices 4. Wireless connection between ventilation control device 2 and exhaust devices 3 and air supply devices 4 eliminates the need for complicated wiring work. Ventilation control device 2 may be communicatively connected to exhaust devices 3 and air supply devices 4 via wired communication.

In particular, ventilation control device 2 sets the exhaust air volume of each exhaust device 3 (the volume of air to be exhausted by each exhaust device 3) by distributing the total exhaust air volume required in general housing 1 according to the maximum exhaust air volume of exhaust device 3, and instructs the set exhaust air volume to each exhaust device 3.

In addition, ventilation control device 2 obtains the actual exhaust air volume, which is the volume of air actually exhausted, from each exhaust device 3, and sets the sum of the actual exhaust air volumes to the total volume of air (total air supply volume) to be supplied to general housing 1. Then, ventilation control device 2 sets the air supply volume of each air supply device 4 (the volume of air to be supplied by each air supply device 4) by distributing the set total air supply volume according to the maximum air supply volume of air supply device 4, and instructs the set air supply volume to each air supply device 4. As a result, the exhaust air volume or the air supply volume is set in a balanced manner according to the capacity of each exhaust device 3 and each air supply device 4, so that the energy saving operation of ventilation system 40 can be achieved.

Each of exhaust devices 3 is installed in general housing 1, and is capable of delivering air from the inside to the outside of general housing 1. Examples of exhaust device 3 include a ceiling-embedded ventilation fan, a wall-mounted ventilation fan, a range hood, and a heat exchange ventilation fan. FIG. 1 illustrates four ceiling-embedded ventilation fans as exhaust devices 3.

Each of air supply devices 4 is installed in general housing 1, and is capable of delivering air from the outside to the inside of general housing 1. Examples of air supply device 4 include the air supply function of a heat exchange ventilation fan and an air supply fan. FIG. 1 illustrates two air supply fans as air supply devices 4.

Input and output terminal 5 is communicatively connected to ventilation control device 2 via wireless communication. For example, input and output terminal 5 receives an input of information required for constructing ventilation system 40 for storage in ventilation control device 2, or obtains the state of ventilation system 40 from ventilation control device 2 for display. Examples of input and output terminal 5 include a mobile information terminal, such as a mobile phone, a smartphone, and a tablet.

Note that input and output terminal 5 does not always have to be connected to ventilation control device 2 via wireless communication, but may be communicatively connected to ventilation control device 2 via wired communication. In this case, input and output terminal 5 may be realized by a wall-mounted remote controller, for example.

Figure 2:
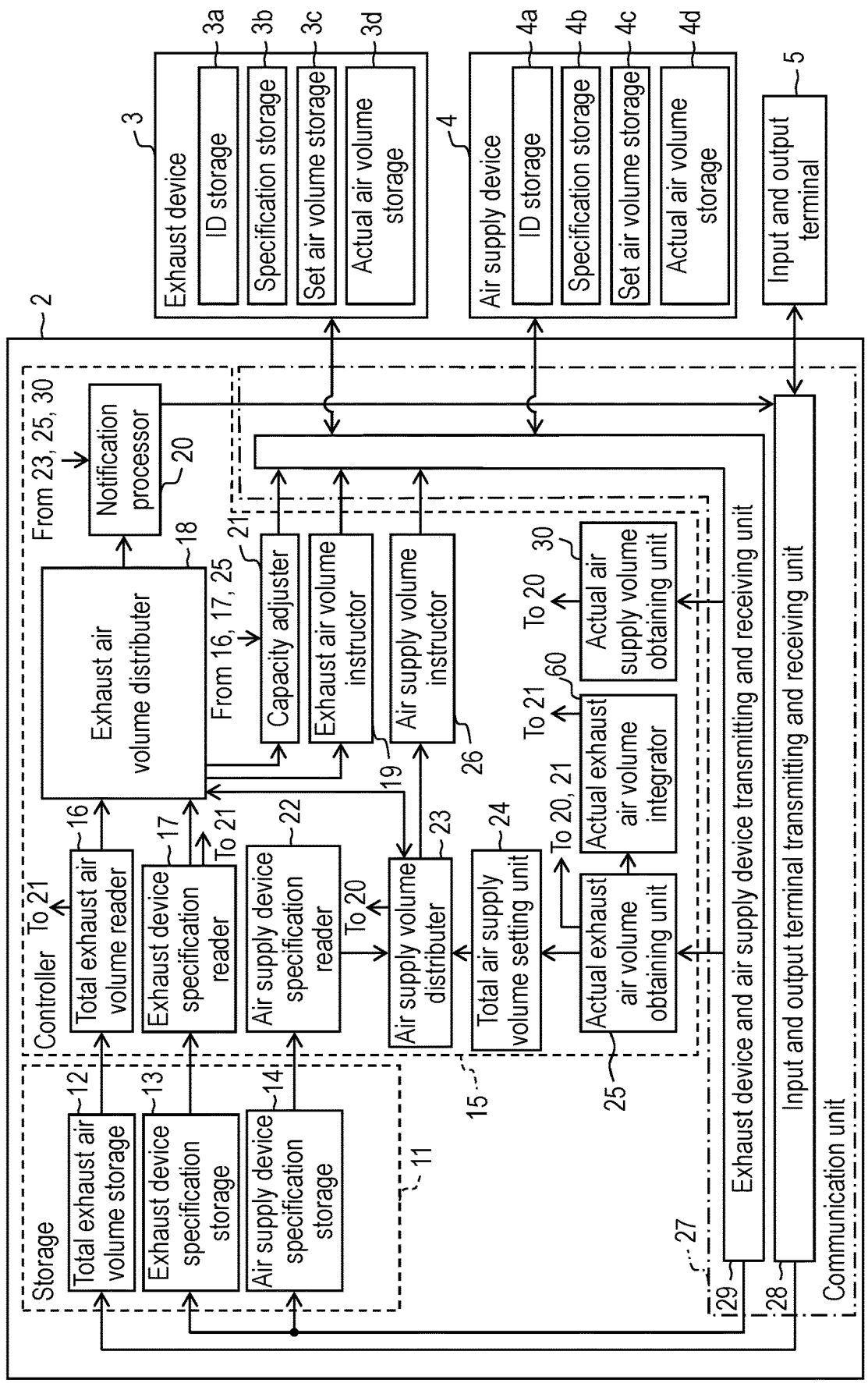
FIG. 2 is a schematic functional block diagram of a ventilation control device according to the first embodiment of the present disclosure.
Figure 3:
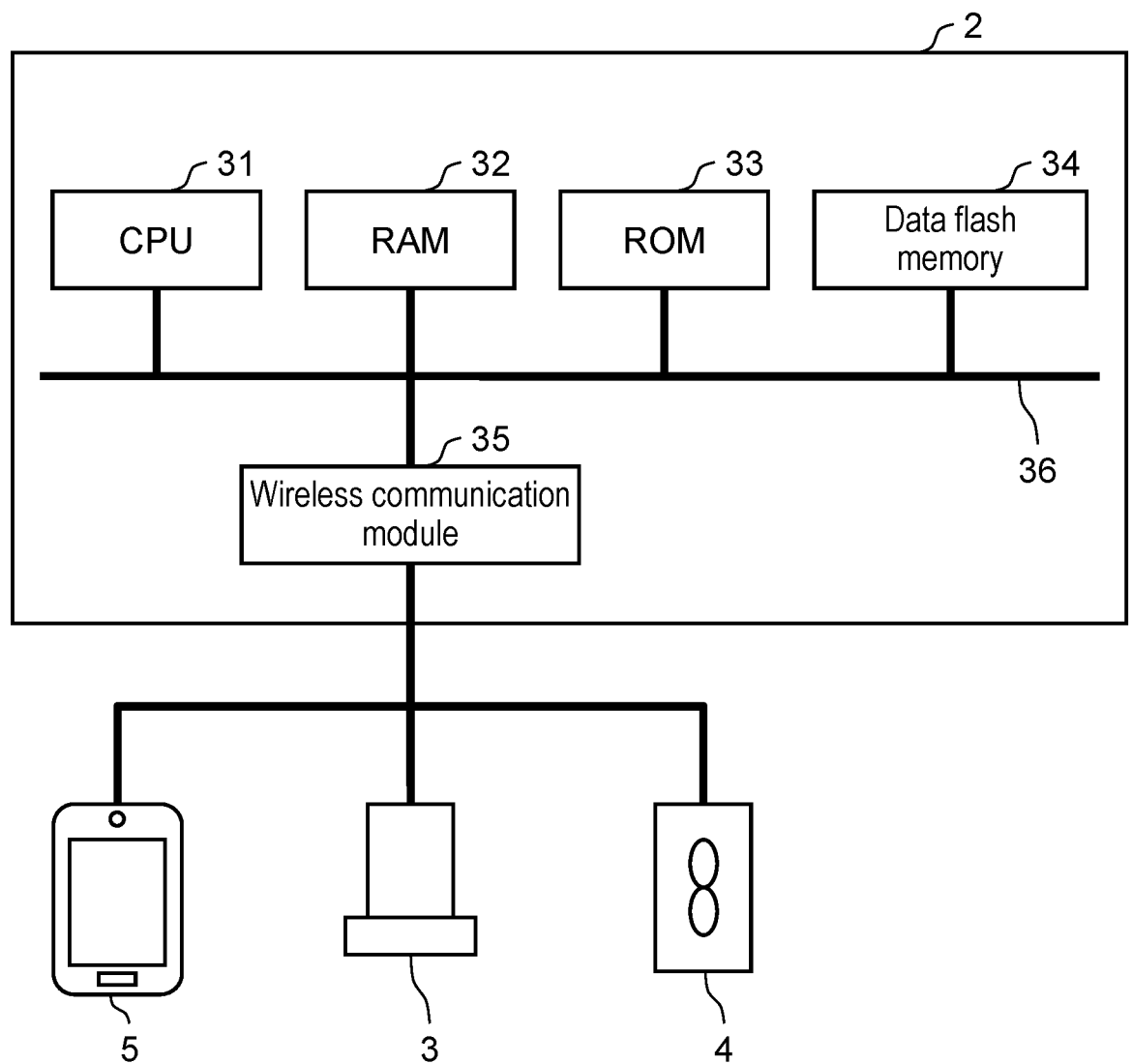
FIG. 3 is an electric block diagram of the ventilation control device.

Next, each function of ventilation control device 2 will be described with reference to FIG. 2 and FIG. 3. FIG. 2 is a schematic functional block diagram of ventilation control device 2. FIG. 3 is an electric block diagram of ventilation control device 2.

As illustrated in FIG. 2, ventilation control device 2 includes storage 11, controller 15, and communication unit 27.

Communication unit 27 includes: input and output terminal transmitting and receiving unit 28 communicatively connected to input and output terminal 5 via wireless communication; and exhaust device and air supply device transmitting and receiving unit 29 communicatively connected to exhaust devices 3 and air supply devices 4 via wireless communication.

Input and output terminal transmitting and receiving unit 28 receives information which is input by input and output terminal 5 and which is required for constructing ventilation system 40, and transmits the state of ventilation system 40 to input and output terminal 5. Input and output terminal transmitting and receiving unit 28 may be connected to the Internet or the like via broadband connection, or may be communicatively connected to input and output terminal 5 via the Internet.

Exhaust device and air supply device transmitting and receiving unit 29 transmits, to each exhaust device 3 and each air supply device 4, the exhaust air volume or the air supply volume set by the distribution performed by ventilation control device 2. Moreover, the exhaust device and air supply device transmitting and receiving unit 29 receives, from each exhaust device 3 and each air supply device 4, information related to the specification of exhaust device 3 and air supply device 4, and information related to the operating state including the actual exhaust air volume or the actual air supply volume in the actual operation.

Storage 11 stores information required for constructing ventilation system 40, and at least includes total exhaust air volume storage 12, exhaust device specification storage 13, and air supply device specification storage 14.

Total exhaust air volume storage 12 stores the total volume of air to be exhausted (total exhaust air volume) necessary for ventilating general housing 1. The total exhaust air volume is input by the user via input and output terminal 5, and is stored in total exhaust air volume storage 12 via input and output terminal transmitting and receiving unit 28.

As a matter of course, the total exhaust air volume varies depending on the size or the number of rooms of each building, the air tightness or the thermal insulating properties of housing, etc., and thus, different values are set for different buildings. The total exhaust air volume is a total volume of air to be exhausted from a predetermined building within a predetermined length of time. The predetermined length of time is, for example, one hour, three hours, or one day (24 hours), and varies depending on the environments and arrangements. Accordingly, in the first embodiment, the predetermined length of time is a length of time which can be arbitrarily set by the user in accordance with laws and regulations, such as environmental standards and ventilation standards for the building for which the ventilation system is constructed, or environmental conditions specific to the building. As an example, in the first embodiment, the predetermined length of time is one hour.

Exhaust device specification storage 13 stores information related to the specification of each of a plurality of exhaust devices 3 connected to ventilation control device 2. Each exhaust device 3 includes ID storage 3a which stores identification information (for example, a manufacturing number or a MAC address) for identifying exhaust device 3, and specification storage 3b which stores information related to the specification of exhaust device 3.

The information related to the specification of exhaust device 3 at least includes the maximum exhaust air volume per unit time, the minimum exhaust air volume per unit time, and the possible exhaust air volume of exhaust device 3. For example, when the exhaust air volume of one exhaust device 3 is switchable between six levels of 30 cubic feet per minute (CFM)/40 CFM/50 CFM/60 CFM/70 CFM/80 CFM, information, indicating 80 CFM as the maximum exhaust air volume, 30 CFM as the minimum exhaust air volume, and 30 CFM/40 CFM/50 CFM/60 CFM/70 CFM/80 CFM as the possible exhaust air volume, is stored in specification storage 3b.

When ventilation control device 2 receives, from each exhaust device 3, the identification information and the information related to the specification of exhaust device 3 via the exhaust device and air supply device transmitting and receiving unit 29, ventilation control device 2 stores the identification information and the information related to the specification in exhaust device specification storage 13 in association with each other. The information related to the specification of each exhaust device 3 may be input by the user via input and output terminal 5, and the information related to the specification of exhaust device 3 received via input and output terminal transmitting and receiving unit 28 may be stored in exhaust device specification storage 13.

Air supply device specification storage 14 stores information related to the specification of each air supply device 4 connected to ventilation control device 2. Each air supply device 4 includes ID storage 4a which stores identification information (for example, a manufacturing number or a MAC address) for identifying air supply device 4, and specification storage 4b which stores information related to the specification of air supply device 4.

The information related to the specification of air supply device 4 at least includes the maximum air supply volume per unit time, the minimum air supply volume per unit time, and the possible air supply volume of air supply device 4. For example, when the air supply volume of one air supply device 4 is switchable between three levels of 30 CFM/40 CFM/50 CFM, information, indicating 50 CFM as the maximum air supply volume, 30 CFM as the minimum air supply volume, and 30 CFM/40 CFM/50 CFM as the possible air supply volume, is stored in specification storage 4b.

When ventilation control device 2 receives, from each air supply device 4, the identification information and the information related to the specification of air supply device 4 via exhaust device and air supply device transmitting and receiving unit 29, ventilation control device 2 stores the identification information and the information related to the specification in air supply device specification storage 14 in association with each other. The information related to the specification of each air supply device 4 may be input by the user via input and output terminal 5, and the information related to the specification of air supply device 4 received via input and output terminal transmitting and receiving unit 28 may be stored in air supply device specification storage 14.

Controller 15 controls operations of exhaust devices 3 and air supply devices 4 connected to ventilation control device 2. Controller 15 at least includes total exhaust air volume reader 16, exhaust device specification reader 17, exhaust air volume distributer 18, exhaust air volume instructor 19, notification processor 20, capacity adjuster 21, air supply device specification reader 22, air supply volume distributer 23, total air supply volume setting unit 24, actual exhaust air volume obtaining unit 25, air supply volume instructor 26, and actual air supply volume obtaining unit 30.

Total exhaust air volume reader 16 reads the total exhaust air volume stored in total exhaust air volume storage 12. The read total exhaust air volume is used by exhaust air volume distributer 18 and capacity adjuster 21.

Exhaust device specification reader 17 reads, as the specification of each exhaust device 3 connected to ventilation control device 2, information related to the maximum exhaust air volume, the minimum exhaust air volume, and the possible exhaust air volume of exhaust device 3 from exhaust device specification storage 13. The read information is used by exhaust air volume distributer 18 and capacity adjuster 21.

Exhaust air volume distributer 18 sets the exhaust air volume of each exhaust device 3 by distributing the total exhaust air volume read by total exhaust air volume reader 16 according to the maximum exhaust air volume of exhaust device 3 read by exhaust device specification reader 17. Details of the distribution method will be described later with reference to the flowchart in FIG. 5.

Exhaust air volume instructor 19 instructs the exhaust air volume set to each exhaust device 3 by exhaust air volume distributer 18 to target exhaust device 3 via exhaust device and air supply device transmitting and receiving unit 29. Each exhaust device 3 includes set air volume storage 3c, and stores the exhaust air volume instructed from exhaust air volume instructor 19. Each exhaust device 3 normally performs an exhaust operation at the exhaust air volume stored in set air volume storage 3c, and changes the exhaust air volume according to the state of the space where exhaust device 3 is installed (humidity change, presence of people, presence of odor, etc.).

Notification processor 20 executes a process for causing input and output terminal 5 to display the setting state, operating state, and the like of each exhaust device 3 and each air supply device 4. Specifically, notification processor 20 causes input and output terminal 5 to display the exhaust air volume of each exhaust device 3 set by exhaust air volume distributer 18 and the air supply volume of each air supply device 4 set by air supply volume distributer 23 to be described later. Notification processor 20 also causes input and output terminal 5 to display, as the operating states of each exhaust device 3 and each air supply device 4, the actual exhaust air volume, which is the volume of air actually exhausted by exhaust device 3, obtained by actual exhaust air volume obtaining unit 25 to be described later, and the actual air supply volume, which is the volume of air actually supplied by air supply device 4, obtained by actual air supply volume obtaining unit 30 to be described later.

Moreover, when the sum of the exhaust air volumes distributed to exhaust devices 3 by exhaust air volume distributer 18 is less than the total exhaust air volume read by total exhaust air volume reader 16, that is, when there is a possibility that desired exhaust cannot be performed with the exhaust capacity of each exhaust device 3, notification processor 20 performs a process for notifying the possibility.

Moreover, when the sum of the exhaust air volumes distributed to exhaust devices 3 by exhaust air volume distributer 18 exceeds the total exhaust air volume read by total exhaust air volume reader 16, that is, when there is a possibility that exhaust more than desired is performed with the exhaust capacity of each exhaust device 3, notification processor 20 performs a process for notifying the possibility.

Moreover, when the sum of the air supply volumes distributed to air supply devices 4 by air supply volume distributer 23 is less than the total air supply volume set by total air supply volume setting unit 24 to be described later, that is, when there is a possibility that desired air supply cannot be performed with the air supply capacity of each air supply device 4, notification processor 20 executes a process for notifying the possibility.

Moreover, when the sum of the air supply volumes distributed to air supply devices 4 by air supply volume distributer 23 exceeds the total air supply volume set by total air supply volume setting unit 24 to be described later, that is, when there is a possibility that air supply more than desired is performed with the air supply capacity of each air supply device 4, notification processor 20 executes a process for notifying the possibility.

As specific processing for such notifications, for example, warning information is transmitted to input and output terminal 5 via input and output terminal transmitting and receiving unit 28. Input and output terminal 5 generates a warning sound or displays a warning screen based on the warning information, so that the user can be notified that desired exhaust cannot be performed or exhaust more than desired is performed with the exhaust capacity of each exhaust device 3, or desired air supply cannot be performed or air supply more than desired is performed with the air supply capacity of each air supply device 4. Moreover, such notifications may be performed by providing a warning lamp in ventilation control device 2 and turning on the warning lamp as the above processing.

Note that ventilation control device 2 may be configured such that information for validating or invalidating the notifications can be stored in storage 11. Accordingly, when the information for validating the notifications can be stored in storage 11, ventilation control device 2 is capable of, for example, transmitting warning information to input and output terminal 5, or turning on a warning lamp disposed in ventilation control device 2. In contrast, when the information for invalidating the notifications can be stored in storage 11, ventilation control device 2 does not transmit the warning information to the input and output terminal 5, and does not turn on the warning lamp disposed in ventilation control device 2. Hence, when notifications are not necessary as the specification of ventilation control device 2, the notifications can be set so as not to occur. The setting for validating/invalidating the notifications may be made by input and output terminal 5 or may be made by an operation switch (not illustrated) disposed in ventilation control device 2.

Moreover, input and output terminal 5 may be configured such that the warning information transmitted from ventilation control device 2 can be validated or invalidated by the user. Accordingly, when the warning information transmitted from ventilation control device 2 is validated in input and output terminal 5, a warning sound can be generated or a warning screen can be displayed based on the warning information. In contrast, when the warning information transmitted from ventilation control device 2 is invalidated in the input and output terminal 5, the generation of the warning sound and the display of the warning screen which are based on the warning information can be stopped from occurring.

Capacity adjuster 21 calculates an integrated air volume obtained by integrating the actual exhaust air volumes of exhaust devices 3 obtained by actual exhaust air volume obtaining unit 25 to be described later. Capacity adjuster 21 then adjusts the exhaust air volume of each exhaust device 3 according to the integrated air volume and the total exhaust air volume required per a predetermined length of time in general housing 1 recognized by total exhaust air volume reader 16.

Specifically, when it is determined that the integrated air volume reaches the total exhaust air volume, no further exhaust operation is required. Hence, capacity adjuster 21 instructs each exhaust device 3 to stop operation. In contrast, when it is determined that the total exhaust air volume is not expected to be achieved within a predetermined length of time based on the integrated air volume, capacity adjuster 21 instructs each exhaust device 3 to operate at the maximum exhaust air volume in order to complete exhaust of the total exhaust air volume within the predetermined length of time.

Capacity adjuster 21 may calculate an integrated air volume that is expected to be achieved within a predetermined length of time based on the current integrated air volume, and calculate a surplus or a deficiency with respect to the total exhaust air volume, so that the exhaust air volume of each exhaust device 3 is adjusted according to the magnitude of the surplus or deficiency.

Air supply device specification reader 22 reads, as the specification of each air supply device 4 connected to ventilation control device 2, information related to the maximum air supply volume, the minimum air supply volume, and the possible air supply volume of air supply device 4 from air supply device specification storage 14. The read information is used by air supply volume distributer 23.

Actual exhaust air volume obtaining unit 25 obtains the actual exhaust air volume, which is the volume of air actually exhausted, from each exhaust device 3. Each exhaust device 3 includes actual air volume storage 3*d*. The exhaust air volume generated by the actual operation is stored in actual air volume storage 3*d*. Actual exhaust air volume obtaining unit 25 obtains the actual exhaust air volume stored in actual air volume storage 3*d* from each exhaust device 3 via exhaust device and air supply device transmitting and receiving unit 29. The obtained actual exhaust air volume is used by notification processor 20, capacity adjuster 21, and total air supply volume setting unit 24.

Total air supply volume setting unit 24 sets the sum of the actual exhaust air volumes of exhaust devices 3 obtained by actual exhaust air volume obtaining unit 25 as the total air supply volume to be supplied to general housing 1. In this way, the total exhaust air volume stored and set in total exhaust air volume storage 12 is not set to the total air supply volume, but the sum of the actual exhaust air volumes is set to the total air supply volume. Hence, it is possible to balance exhaust and air supply according to the actual ventilation operation.

Total air supply volume setting unit 24 may set, to the total air supply volume to be supplied to general housing 1, a value obtained by adding a given percentage or a given air volume to the sum of the actual exhaust air volumes of exhaust devices 3 obtained by actual exhaust air volume obtaining unit 25. Accordingly, in ventilation system 40, the supercharging function, which performs an air supply operation in which a given percentage or a given air volume is added to the actual exhaust air volume, can be achieved.

Air supply volume distributer 23 sets the air supply volume of each air supply device 4 by distributing the total air supply volume set by total air supply volume setting unit 24 according to the maximum air supply volume of each air supply device 4 read by air supply device specification reader 22. Details of this distribution method will be described later with reference to the flowchart in FIG. 8.

Air supply volume instructor 26 instructs the air supply volume set to each air supply device 4 by air supply volume distributer 23 to target air supply device 4 via exhaust device and supply device transmitting and receiving unit 29. Each air supply device 4 includes set air volume storage 4*c*, and stores the air supply volume instructed from air supply volume instructor 26. Each air supply device 4 normally performs an air supply operation at the air supply volume stored in set air volume storage 4*c*, and changes the air supply volume according to the operating state of exhaust device 3.

Actual air supply volume obtaining unit 30 obtains the actual air supply volume, which is the volume of air actually supplied, from each air supply device 4. Each air supply device 4 includes actual air volume storage 4*d*, and stores the air supply volume of the actual operation in actual air volume storage 4*d*. Actual air supply volume obtaining unit 30 obtains the actual air supply volume stored in actual air volume storage 4*d* from each air supply device 4 via exhaust device and air supply device transmitting and receiving unit 29. The obtained actual air supply volume is displayed on input and output terminal 5 by notification processor 20 as indicating the operating state of each air supply device 4.

Ventilation control device 2 is provided as a microcomputer, as illustrated in FIG. 3. In other words, ventilation control device 2 includes central processing unit (CPU) 31, read only memory (ROM) 33, random access memory (RAM) 32 and data flash memory 34 as storage 11. These elements are connected to each other via internal bus 36. Ventilation control device 2 also includes wireless communication module 35 as a device that functions as communication unit 27. Wireless communication module 35 is also connected to internal bus 36. Wireless communication module 35 enables communication by wireless communication between input and output terminal 5, exhaust devices 3, and air supply devices 4 connected to ventilation control device 2.

CPU 31 uses, for example, RAM 32 as a work area, executes a program stored in ROM 33 or data flash memory 34, and sends and receives data and commands to and from storage 11 and each device based on the execution result to control the operation of each device. Controller 15 and each unit included in controller 15 are programs stored in ROM 33 and data flash memory 34, and execute predetermined processing by being executed by CPU 31.

Note that data flash memory 34, ROM 33, and RAM 32 are not necessarily limited to the above examples, but other types of memories can be used as long as they function as memories. Moreover, the device, such as wireless communication module 35, does not have to be included in the microcomputer, but may be an externally connected device.

Figure 4:
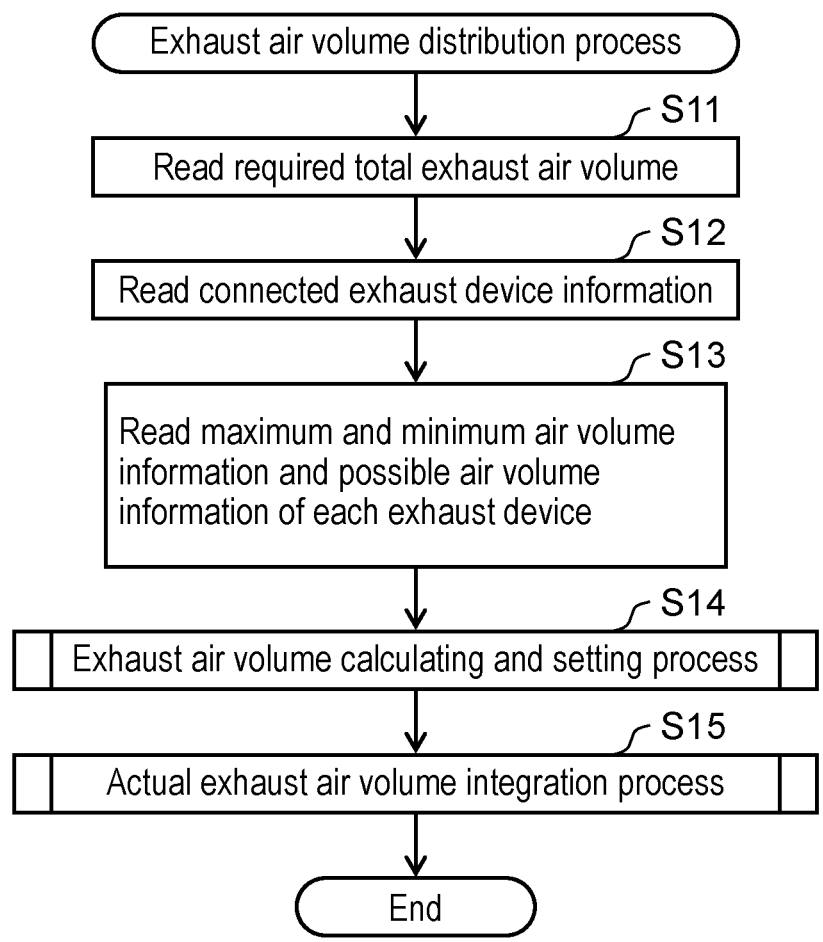
FIG. 4 is a flowchart of an exhaust air volume distribution process executed by the ventilation control device.

Next, an exhaust air volume distribution process executed by CPU 31 of ventilation control device 2 will be described with reference to FIG. 4. FIG. 4 is a flowchart of the exhaust air volume distribution process. The exhaust air volume distribution process is a process for setting the exhaust air volume of each exhaust device 3 by distributing the total exhaust air volume set to general housing 1 according to the maximum exhaust air volume of exhaust device 3. Moreover, the exhaust air volume distribution process also calculates an integrated air volume obtained by integrating the actual exhaust air volumes of exhaust devices 3, and adjusts the exhaust air volume of each exhaust device 3 according to the integrated air volume and the total exhaust air volume required per a predetermined length of time.

The exhaust air volume distribution process is executed when the number of connected exhaust devices which are controllable changes, such as when connection of new exhaust device 3 to ventilation control device 2 is input by input and output terminal 5 or when defects of one or more connected exhaust devices 3 are detected. When defects of one or more connected exhaust devices 3 are detected, the exhaust air volume distribution process is executed excluding exhaust devices 3 for which the defects are detected.

The detection of the defects of exhaust devices 3 may be performed by receiving a notification notifying the malfunction from exhaust device 3 via exhaust device and air supply device transmitting and receiving unit 29, or by ventilation control device 2 making a determination after checking the operating state of exhaust device 3 received from exhaust device 3. Moreover, it may be determined that exhaust device 3 has a defect when communication with exhaust device 3 cannot be performed for a predetermined length of time or more. When the defects of one or more exhaust devices 3 are detected, the exhaust air volume distribution process may be executed after waiting for a predetermined length of time required to obtain the total exhaust air volume.

In the exhaust air volume distribution process, first, ventilation control device 2 reads the required total exhaust air volume set to general housing 1 from total exhaust air volume storage 12 (S11). The processing in S11 is executed by total exhaust air volume reader 16. Next, ventilation control device 2 reads information for identifying exhaust devices 3 connected to ventilation control device 2 (S12). In S12, for example, ventilation control device 2 reads the information for identifying exhaust devices 3 by accessing connected exhaust devices 3 via exhaust device and air supply device transmitting and receiving unit 29 and obtaining the identification information stored in ID storage 3a of each exhaust device 3. By ventilation control device 2 directly accessing exhaust devices 3, the exhaust air volumes can be distributed to exhaust devices 3 which can be communicated with.

Next, ventilation control device 2 reads (S13), from exhaust device specification storage 13, information related to the maximum exhaust air volume, the minimum exhaust air volume, and the possible exhaust air volume of each of exhaust devices 3 specified by the processing in S12 as the information related to the specification of exhaust device 3. The processing in S13 is executed by exhaust device specification reader 17.

Ventilation control device 2 then executes the exhaust air volume calculating and setting process (S14). The exhaust air volume calculating and setting process in S14 is a process for calculating the exhaust air volume to be set to each exhaust device 3 by using information such as the total exhaust air volume read in the processing in S11 and the maximum exhaust air volume of each exhaust device 3 read in the processing in S13. Details of the exhaust air volume calculating and setting process will be described later with reference to FIG. 5.

Next, ventilation control device 2 executes the actual exhaust air volume integration process (S15), and ends the exhaust air volume distribution process. The actual exhaust air volume integration process in S15 is a process for calculating an integrated air volume obtained by integrating the actual exhaust air volumes of exhaust devices 3, and adjusting the exhaust air volume of each exhaust device 3 according to the integrated air volume and the total exhaust air volume required per a predetermined length of time. Details of the actual exhaust air volume integration process will be described later with reference to FIG. 6.

Figure 5:
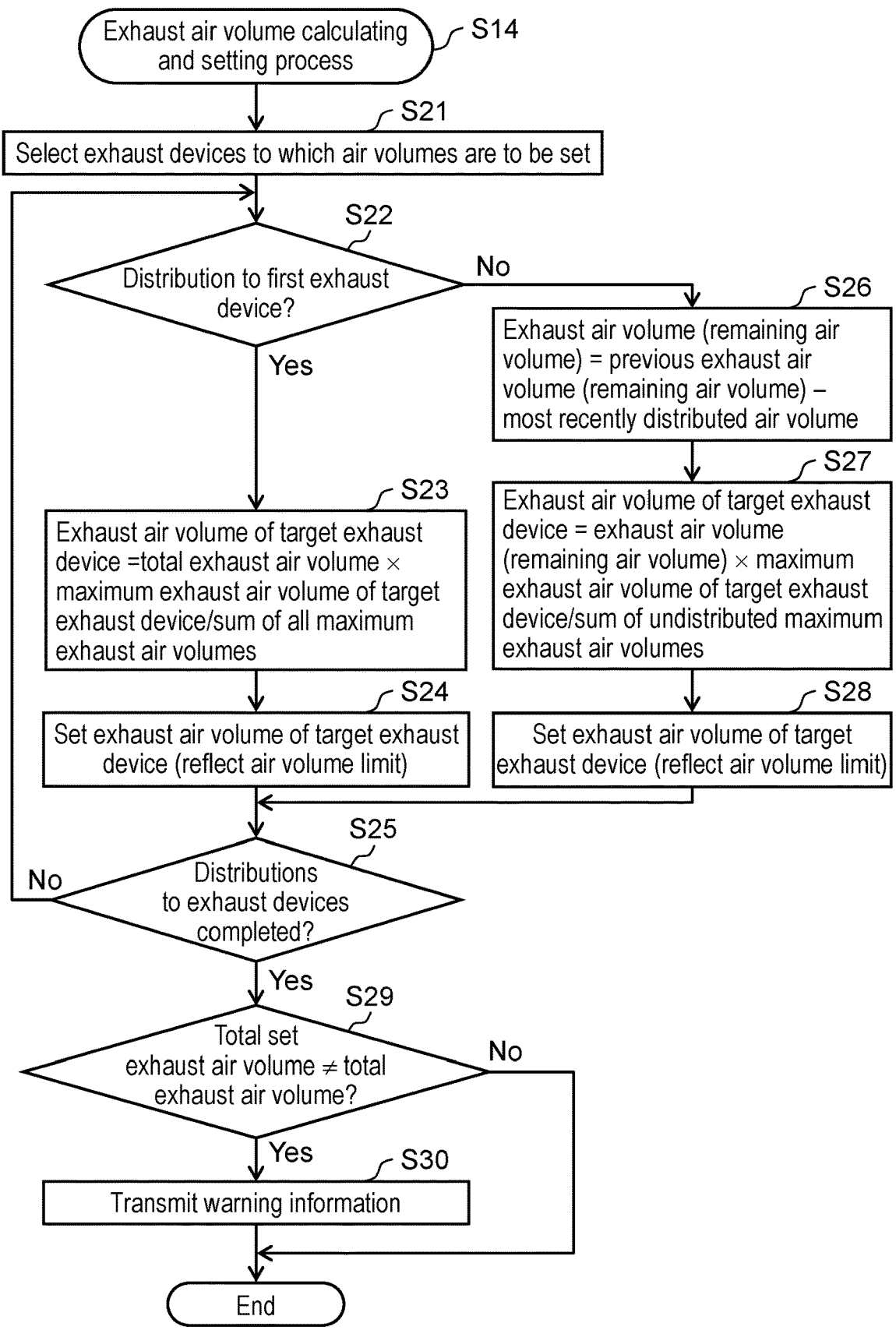
FIG. 5 is a flowchart of an exhaust air volume calculating and setting process executed by the ventilation control device.

Here, the details of the exhaust air volume calculating and setting process (S14) will be described with reference to FIG. 5. FIG. 5 is a flowchart of the exhaust air volume calculating and setting process (S14). Here, the exhaust air volume calculating and setting process (S14) will be described with an example where the total exhaust air volume set to general housing 1 is 320 CFM and the exhaust air volumes are distributed to three exhaust devices α, β, γ. It is assumed that exhaust devices α, β, and γ are capable of outputting exhaust air volume in increments of 10 CFM, and that the maximum exhaust air volume and the minimum exhaust air volume of exhaust devices α, β, and γ are 200/50, 150/50, and 80/30, respectively.

The total exhaust air volume read by total exhaust air volume reader 16 is the total volume of air to be exhausted from a predetermined building within a predetermined length of time, as described above. In contrast, in the exhaust air volume calculating and setting process (S14), the volume of air to be exhausted per minute is set to each exhaust device 3 as the exhaust air volume. Accordingly, in the exhaust air volume calculating and setting process (S14), a volume obtained by converting the total exhaust air volume read by total exhaust air volume reader 16 into the total exhaust air volume to be exhausted per minute is used as the total exhaust air volume to be distributed to each exhaust device 3.

In the exhaust air volume calculating and setting process (S14), ventilation control device 2 first selects exhaust devices 3 to which the exhaust air volumes are to be set, and determines the order that exhaust devices 3 are set (S21). Specifically, exhaust devices 3 connected to ventilation control device 2 and specified by the processing in S12 in the exhaust air volume distribution process (FIG. 4) are selected as exhaust devices 3 to which the exhaust air volumes are to be set, and the order that exhaust devices 3 are set is determined in order of highest maximum exhaust air volume. In the above example, the exhaust air volume is set in order of exhaust device α, exhaust device β, and exhaust device γ. By distributing the exhaust air volume in order of highest maximum exhaust air volume, it is possible to reduce the possibility that the sum of exhaust air volumes distributed to all exhaust devices 3 does not reach the total exhaust air volume when distribution of the exhaust air volumes to all exhaust devices 3 is completed. However, in the exhaust air volume calculating and setting process (S14), it is not always necessary to distribute the exhaust air volumes to exhaust devices in order of highest maximum exhaust air volume, but the exhaust air volumes may be distributed to exhaust devices 3 in any order.

Next, ventilation control device 2 determines whether to perform distribution of the exhaust air volume to first exhaust device 3, that is, whether or not an exhaust air volume has not yet been distributed to any exhaust devices 3 (S22). When it is determined that distribution of the exhaust air volume to first exhaust device 3 is to be performed (exhaust air volume has not yet been distributed to any exhaust device 3) (S22: Yes), ventilation control device 2 then calculates the exhaust air volume for first exhaust device 3 (exhaust device α in the above example) by the following formula (1), and distributes the total exhaust air volume (S23).

Exhaust air volume of target exhaust device 3=total exhaust air volume×maximum exhaust air volume of target exhaust device 3/sum of all maximum exhaust air volumes  (1)

For example, in the above example, the exhaust air volume of exhaust device α is calculated as follows.

Exhaust air volume of exhaust device α=320×200/430=148.8 CFM

Then, the possible exhaust air volume of first exhaust device 3 which is greater than or equal to and closest to the exhaust air volume calculated in the processing in S23 is set to the exhaust air volume to be distributed to first exhaust device 3 (S24). For example, in the above example, the exhaust air volume of exhaust device α is set to 150 CFM.

In the processing in S24, when the exhaust air volume calculated in the processing in S23 exceeds the maximum exhaust air volume of first exhaust device 3, the exhaust air volume of first exhaust device 3 is set to the maximum exhaust air volume. In the processing in S24, when the exhaust air volume calculated in the processing in S23 is less than the minimum exhaust air volume of first exhaust device 3, the exhaust air volume of first exhaust device 3 is set to the minimum exhaust air volume. Accordingly, it is possible to prevent the exhaust air volume that exceeds the capacity range of exhaust device 3 from being distributed to exhaust device 3. The exhaust air volume set in the processing in S24 is instructed to target exhaust device 3 via exhaust device and air supply device transmitting and receiving unit 29. In other words, the processing in S24 is executed by exhaust air volume instructor 19.

In the processing in S24, the possible exhaust air volume of first exhaust device 3 which is greater than or equal to and closest to the exhaust air volume calculated in the processing in S23 is set to the exhaust air volume to be distributed to first exhaust device 3. However, the present disclosure is not always limited to such an example. For example, the possible exhaust air volume of first exhaust device 3 closest to the exhaust air volume calculated in the processing in S23 may be set to the exhaust air volume to be distributed to first exhaust device 3. Moreover, the possible exhaust air volume of first exhaust device 3 which is less than or equal to and closest to the exhaust air volume calculated in the processing in S23 may be set to the exhaust air volume to be distributed to first exhaust device 3.

Next, it is determined whether or not the distributions of the exhaust air volumes to exhaust devices 3 selected in the processing in S21 are completed (S25). When it is not completed (S25: No), the processing returns to S22.

When it is determined, as a result of the determination in S22, that distribution of the exhaust air volume to second and subsequent exhaust devices 3 is to be performed (the exhaust air volume has already been distributed to first exhaust device 3) (S22: No), the processing proceeds to S26. In the processing in S26, the undistributed exhaust air volume (remaining air volume) in the total exhaust air volume is calculated by the following formula (2).

$$\text{Exhaust air volume (remaining air volume)} = \text{previous exhaust air volume (remaining air volume)} - \text{most recently distributed air volume} \quad (2)$$

Here, the previous exhaust air volume (remaining air volume) is the sum of the undistributed exhaust air volumes (remaining air volumes) at the time of the previous distribution of the exhaust air volume, and the most recently distributed air volume is the exhaust air volume distributed to exhaust device 3 just before.

Next, the exhaust air volume for next distribution target exhaust device 3 is calculated by the following formula (3) using the exhaust air volume (remaining air volume) calculated by the formula (2), and the total exhaust air volume is distributed (S27).

$$\text{Exhaust air volume of target exhaust device 3} = \text{exhaust air volume (remaining air volume)} \times \text{maximum exhaust air volume of target exhaust device 3/sum of undistributed maximum exhaust air volumes} \quad (3)$$

Here, the sum of the undistributed maximum exhaust air volumes is the sum of the maximum exhaust air volumes of exhaust devices 3 to which the distributions have not yet been made.

Then, the possible exhaust air volume of distribution target exhaust device 3 which is greater than or equal to and closest to the exhaust air volume calculated in the processing in S27 is set to the exhaust air volume to be distributed to distribution target exhaust device 3 (S28). Here, in a similar manner to the processing in S24, when the exhaust air volume calculated in the processing in S27 exceeds the maximum exhaust air volume of target exhaust device 3 or is less than the minimum exhaust air volume of target exhaust device 3, the exhaust air volume of target exhaust device 3 is set to the maximum exhaust air volume or the minimum exhaust air volume. The exhaust air volume set in the processing in S28 is instructed to target exhaust device 3 via exhaust device and air supply device transmitting and receiving unit 29. In other words, the processing in S28 is also executed by exhaust air volume instructor 19.

After the processing in S28, the processing proceeds to S25. The processing in S22 to S28 is repeatedly executed until the distributions to all exhaust devices 3 selected in the processing in S21 are completed. The processing in S22 to S28 is executed by exhaust air volume distributor 18.

Here, the processing in S26 to S28 will be described using the above example. First, when the exhaust air volume is distributed to exhaust device β as second exhaust device 3, the exhaust air volume (remaining air volume) is first calculated in the processing in S26. The undistributed exhaust air volume at the time of distribution of the exhaust air volume to first exhaust device α is the total exhaust air volume itself (320 CFM). Since 150 CFM has been distributed as the exhaust air volume to first exhaust device α, the exhaust air volume (remaining air volume) is as follows.

$$\text{Exhaust air volume (remaining air volume)} = 320 - 150 = 170 \text{ CFM}$$

In the processing in S27, the exhaust air volume of second exhaust device β is calculated as follows.

$$\text{Exhaust air volume of exhaust device } \beta = 170 \times 150/230 = 110.8 \text{ CFM}$$

Then, in the processing in S28, the exhaust air volume of second exhaust device β is set to 120 CFM.

Next, when the exhaust air volume is distributed to exhaust device γ as third exhaust device 3, too, the exhaust air volume (remaining air volume) is first calculated in the processing in S26. The undistributed exhaust air volume at the time of distribution of the exhaust air volume to second exhaust device β is 170 CFM. Since 120 CFM has been distributed to second exhaust device β as the exhaust air volume, the exhaust air volume (remaining air volume) is as follows.

$$\text{Exhaust air volume (remaining air volume)} = 170 - 120 = 50 \text{ CFM}$$

In the processing in S27, the exhaust air volume of third exhaust device γ is calculated as follows.

Exhaust air volume of exhaust device $\gamma = 50 \times 80/80 = 50$ CFM

Then, in the processing in S28, the exhaust air volume of third exhaust device γ is set to 50 CFM.

As can be seen from the above formula, when distribution to final distribution target exhaust device 3 is performed, the exhaust air volume (remaining air volume) calculated in the processing in S26 is calculated as the exhaust air volume of final exhaust device 3 in the processing in S27. Hence, when distribution is performed on final target exhaust device 3, the processing in S27 may be skipped after the processing in S26, and the exhaust air volume (remaining air volume) calculated in the processing in S26 may be used in the processing in S28 as the exhaust air volume calculated for distribution target exhaust device 3.

When it is determined, as a result of the determination in S25, that the distributions to all of exhaust devices 3 selected in the processing in S21 are completed (S25: Yes), then, it is determined whether or not the sum of the exhaust air volumes set to all of exhaust devices 3 to which the exhaust air volumes have been distributed (hereinafter, referred to as "total set exhaust air volume") is different from the total exhaust air volume (S29).

When low-capacity exhaust devices 3 are installed in general housing 1, even if all of exhaust devices 3 to which the exhaust air volumes have been distributed are set to the maximum exhaust air volumes, the total exhaust air volume may not be reached. In contrast, when high-capacity exhaust devices 3 are installed in general housing 1, even if all of exhaust devices 3 to which the exhaust air volumes have been distributed are set to the minimum exhaust air volumes, the total exhaust air volume may be exceeded. In S29, it is determined whether or not such an event is occurring.

When it is determined, as a result of the determination in S29, that the total set exhaust air volume is different from the total exhaust air volume (S29: Yes), warning information indicating such a state is transmitted to input and output terminal 5 via input and output terminal transmitting and receiving unit 28 (S30). Then, the exhaust air volume calculating and setting process ends. The processing in S30 is executed by notification processor 20. Input and output terminal 5 is capable of informing the user that there is a possibility that desired exhaust cannot be performed or exhaust more than desired is performed with the exhaust capacity of each exhaust device 3, by generating a warning sound or displaying a warning screen based on the warning information.

Here, it is preferable that the warning information includes information indicating whether or not the total set exhaust air volume is less than the total exhaust air volume. By changing the notification method used by input and output terminal 5 according to the details of the information, it is possible to clearly inform the user that there is a possibility that desired exhaust cannot be performed with the exhaust capacity of each exhaust device 3, or there is a possibility that exhaust more than desired is performed with the exhaust capacity of each exhaust device 3.

Moreover, when the total set exhaust air volume is less than the total exhaust air volume, each exhaust device 3 is instructed to operate at the maximum exhaust air volume in S30. Accordingly, when the exhaust capacity of each of installed exhaust devices 3 are too low, each exhaust device 3 is operated at the maximum exhaust air volume, so that the closest possible exhaust to the total exhaust air volume can be performed. When the total set exhaust air volume is greater than the total exhaust air volume, each exhaust device 3 is instructed to operate at the minimum exhaust air volume in S30. Accordingly, when the exhaust capacity of each installed exhaust device 3 is too high, each exhaust device 3 is operated at the minimum exhaust air volume, so that the closest possible exhaust to the total exhaust air volume can be performed.

In the processing in S30, when warning information is transmitted to input and output terminal 5, the operation of each exhaust device 3 may be stopped. In addition, when warning information is transmitted to input and output terminal 5, whether or not to operate each exhaust device 3 may be selected at the time of installation of ventilation control device 2 or by user settings.

Moreover, in the processing in S29, it may be that only whether or not the total set exhaust air volume is less than the total exhaust air volume is determined and when the total set exhaust air volume is less than the total exhaust air volume, warning information is transmitted to input and output terminal 5 and each exhaust device 3 is instructed to operate at the maximum exhaust air volume. When the total set exhaust air volume is greater than the total exhaust air volume, the operation of each exhaust device 3 is stopped when the exhaust air volume actually exhausted by each exhaust device 3 (integrated air volume) reaches the total exhaust air volume, and a warning is not necessarily required.

When it is determined, as a result of the processing in S29, that the total set exhaust air volume is equal to the total exhaust air volume (S29: No), the exhaust air volume calculating and setting process ends. As described above, when setting information, which invalidates the notification that there is a possibility that desired exhaust cannot be performed or exhaust more than desired is performed with the exhaust capacity of each exhaust device 3, is stored in storage 11, in the processing in S30, the warning information is not transmitted to input and output terminal 5, and each exhaust device 3 is instructed to operate at the maximum exhaust air volume or the minimum exhaust air volume according to the magnitude relationship between the total set exhaust air volume and the total exhaust air volume.

Figure 6:
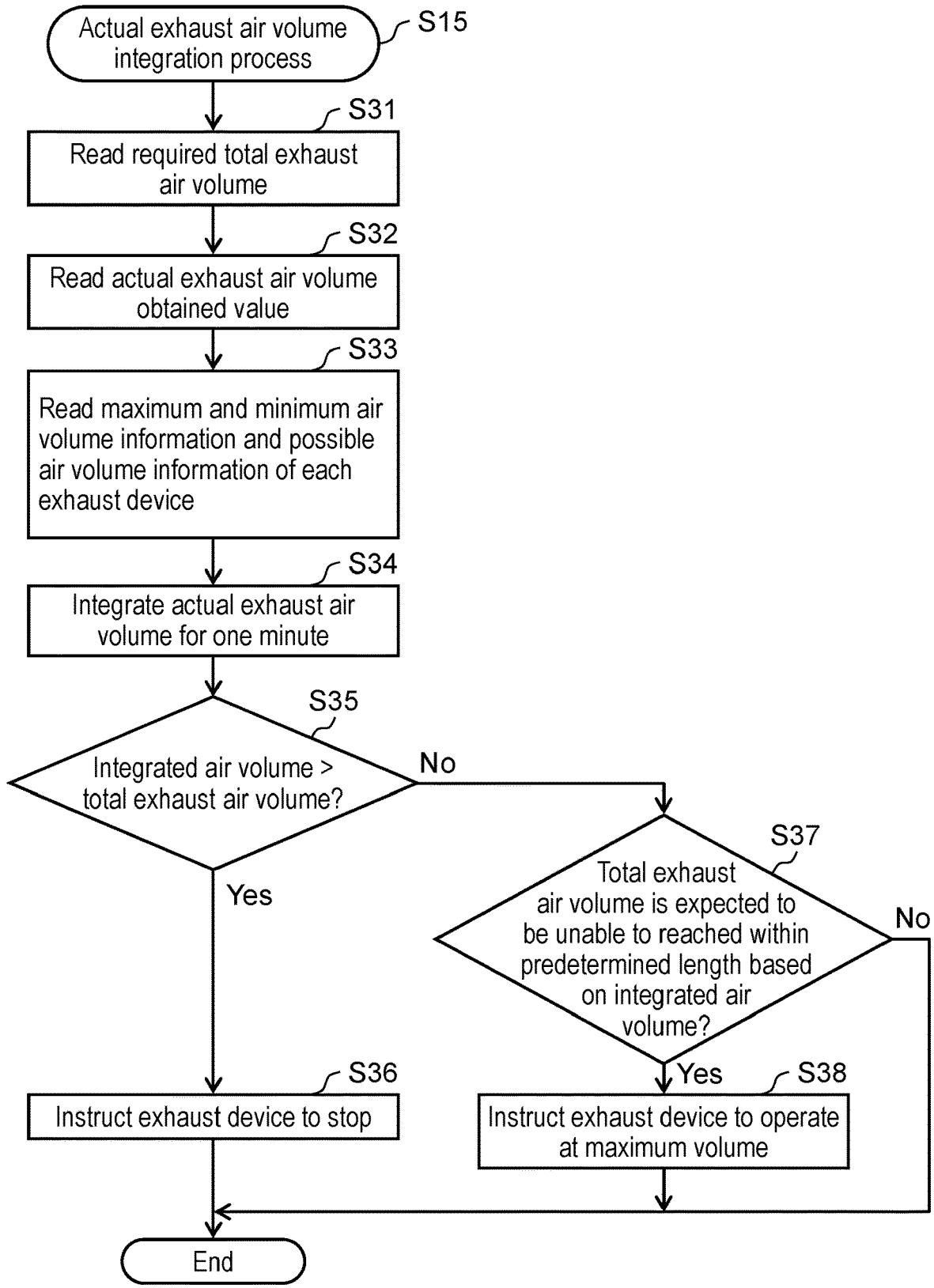
FIG. 6 is a flowchart of an actual exhaust air volume integration process executed by the ventilation control device.

Next, details of the actual exhaust air volume integration process (S15) will be described with reference to FIG. 6. FIG. 6 is a flowchart of the actual exhaust air volume integration process (S15).

In the actual exhaust air volume integration process (S15), first, the required total exhaust air volume set to general housing 1 is read from total exhaust air volume storage 12 (S31). The processing in S31 is executed by total exhaust air volume reader 16. The total exhaust air volume here is different from the total exhaust air volume used in the exhaust air volume calculating and setting process, and is the total exhaust air volume required per a predetermined length of time (for example, one hour).

Next, the actual exhaust air volume that is the actually exhausted air volume stored in actual air volume storage 3d of each exhaust device 3 is obtained from exhaust device 3 (S32). The processing in S32 is executed by actual exhaust air volume obtaining unit 25.

Next, information related to the maximum exhaust air volume, the minimum exhaust air volume, and the possible exhaust air volume of each exhaust device 3 is read from exhaust device specification storage 13 as information related to the specification of exhaust device 3 (S33). The processing in S33 is executed by exhaust device specification reader 17.

Next, an integrated air volume is calculated by integrating the volume of air actually exhausted by each exhaust device 3 every minute for each whole minute based on the actual exhaust air volume of exhaust device 3 obtained by the processing in S32 (S34). In the processing in S34, the integrated air volume is reset to 0 every time a predetermined length of time elapses. Accordingly, the actual exhaust air volume is integrated every predetermined length of time, and the exhaust air volume of each exhaust device 3 is adjusted according to the integrated air volume and the total exhaust air volume required per a predetermined length of time. The processing in S34 is executed by actual exhaust air volume integrator 60.

It is then determined whether or not the integrated air volume calculated in the processing in S34 is greater than the total exhaust air volume read by the processing in S31 (S35). As a result, when it is determined that the integrated air volume is greater than the total exhaust air volume (S35: Yes), it means that the integrated air volume has reached the total exhaust air volume. Hence, in this case, a stop command is transmitted to each exhaust device 3 (S36). Accordingly, when the integrated air volume reaches the total exhaust air volume before a predetermined length of time elapses, it is possible to prevent exhaust more than necessary from being performed, by stopping the exhaust operation of each exhaust device 3. Since the integrated air volume has reached the total exhaust air volume after the processing in S36 is executed, the calculation of the integrated air volume by the processing in S34 may be stopped until the predetermined length of time elapses.

In contrast, when it is determined, as a result of the processing in S35, that the integrated air volume is equal to or less than the total exhaust air volume (S35: No), the integrated air volume expected to be achieved within a predetermined length of time is calculated based on the integrated air volume calculated in S34 and the actual exhaust air volume of each exhaust device 3 at that time. Then, it is determined whether or not the integrated air volume is expected to be unable to achieve the total exhaust air volume within the predetermined length of time (S37). As a result, when it is determined that the integrated air volume is expected to be unable to achieve the total exhaust air volume within the predetermined length of time (S37: Yes), each exhaust device 3 is instructed to operate at the maximum exhaust air volume (S38). Accordingly, when it is expected that the total exhaust air volume cannot be achieved within a predetermined length of time if the operation is continued with the current exhaust air volume set to each exhaust device 3, the exhaust air volume of each exhaust device 3 is set to the maximum exhaust air volume. By doing so, it is possible to perform control such that exhaust of the total exhaust air volume can be achieved within a predetermined length of time as well as possible.

In contrast, when it is determined, as a result of the processing in S37, that the total exhaust air volume is expected to be achieved within the predetermined length of time (S37: No), the processing of S36 and S38 is skipped, and the current exhaust air volume set to each exhaust device 3 is maintained.

The processing of S34 to S38 is repeated every minute. When the processing in S34 to S38 causes the exhaust air volume distribution process illustrated in FIG. 4 to start, the processing in S34 to S38 ends. The processing in S34 to S38 is executed by capacity adjuster 21.

In the processing in S37, it may be that an integrated air volume that is expected to be achieved within a predetermined length of time is calculated based on the current integrated air volume, a surplus or deficiency with respect to the total exhaust air volume is calculated, and the exhaust air volume of each exhaust device 3 is set according to the magnitude of the surplus or deficiency in a stepwise manner according to information of the maximum exhaust air volume, the minimum exhaust air volume, and the possible exhaust air volume of each exhaust device 3 read in the processing in S33. Specifically, when the integrated air volume expected to be achieved within a predetermined length of time will be in surplus with respect to the total exhaust air volume, a deceleration operation for setting the exhaust air volume of each exhaust device 3 to a smaller volume may be instructed according to the magnitude of surplus. Moreover, when the integrated air volume expected to be achieved within a predetermined length of time is deficient with respect to the total exhaust air volume, an acceleration operation for setting the exhaust air volume of each exhaust device 3 to a larger volume may be instructed according to the magnitude of the deficiency.

Figure 7:
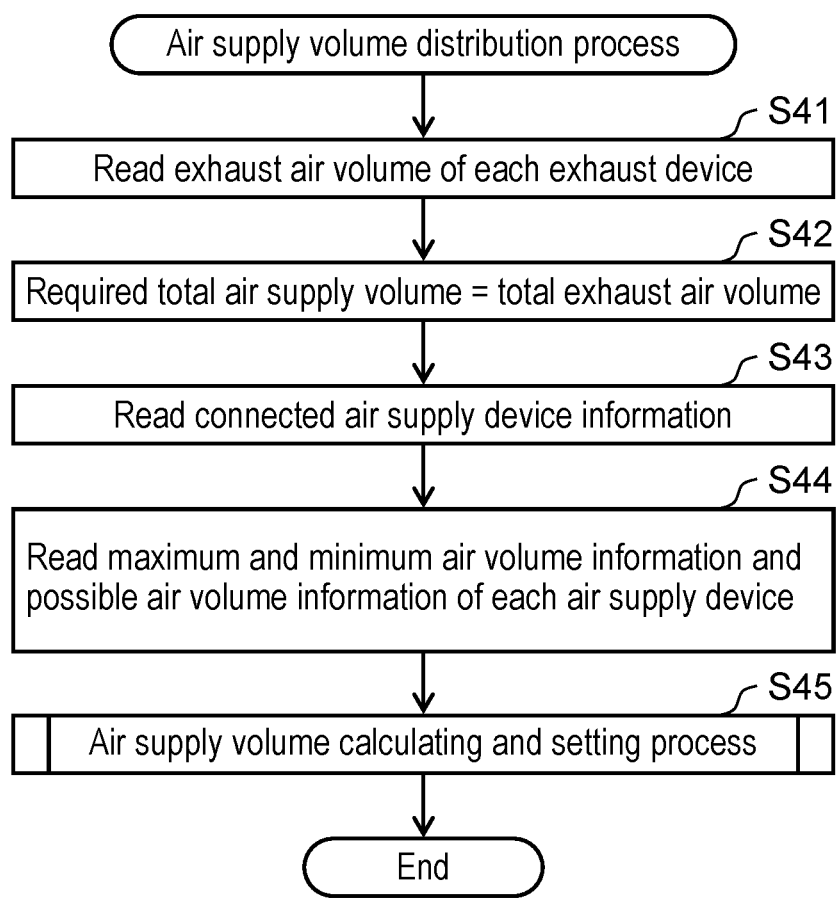
FIG. 7 is a flowchart of an air supply volume distribution process executed by the ventilation control device.

Next, the air supply volume distribution process executed by CPU 31 of ventilation control device 2 will be described with reference to FIG. 7. FIG. 7 is a flowchart of the air supply volume distribution process. In the air supply volume distribution process, the sum of the actual exhaust air volumes when exhaust devices 3 are actually operated is set to the total air supply volume. In the air supply volume distribution process, the air supply volume of each air supply device 4 is then set by distributing the total air supply volume according to the maximum air supply volume of air supply device 4.

The air supply volume distribution process is executed after the distribution of the exhaust air volume to each exhaust device 3 in the exhaust air volume distribution process or when the defects of one or more connected air supply devices 4 are detected. When the defects of one or more connected air supply devices 4 are detected, the air supply volume distribution process is executed excluding air supply devices 4 for which the defects have been detected.

The detection of the defects of air supply devices 4 may be performed by receiving a notification indicating the malfunctions from air supply device 4 via exhaust device and air supply device transmitting and receiving unit 29, or by ventilation control device 2 making a determination after checking the operating state of air supply device 4 received from air supply device 4. Moreover, it may be determined that air supply device 4 has a defect when communication with air supply device 4 cannot be performed for a predetermined length of time or more. In addition, when the defects of one or more air supply devices 4 are detected, the air supply volume distribution process may be executed after waiting for a predetermined length of time required to obtain the total air supply volume (or total exhaust air volume).

In the air supply volume distribution process, first, the actual exhaust air volume which is the volume of air actually exhausted by each exhaust device 3 is read from each exhaust device 3 via exhaust device and air supply device transmitting and receiving unit 29 (S41). The processing in S41 is executed by actual exhaust air volume obtaining unit 25.

Next, the sum of the actual exhaust air volumes (total exhaust air volume) of exhaust devices 3 read in S41 is set to the total air supply volume required for air supply (S42). The processing in S42 is executed by total air supply volume setting unit 24.

Next, information for identifying air supply devices 4 connected to ventilation control device 2 is read (S43). In S43, information for identifying air supply devices 4 is read by, for example, accessing connected air supply devices 4 via exhaust device and air supply device transmitting and receiving unit 29 and obtaining the identification information stored in ID storage 4a of each air supply device 4. By ventilation control device 2 directly accessing air supply devices 4, the air supply volumes can be distributed to air supply devices 4 which can be communicated with.

Next, as information related to the specification of each air supply device 4 identified by the processing in S44, information related to the maximum air supply volume, the minimum air supply volume, and the possible air supply volume of each air supply device 4 is read from air supply device specification storage 14 (S44). The processing in S44 is executed by air supply device specification reader 22.

Then, ventilation control device 2 executes the air supply volume calculating and setting process (S45), and ends the air supply volume distribution process. The air supply volume calculating and setting process in S45 is a process for calculating the air supply volume to be set to individual air supply device 4 by using the total air supply volume set by the processing in S42 and the information such as the maximum air supply volume of each air supply device 4 read by the processing in S44.

Figure 8:
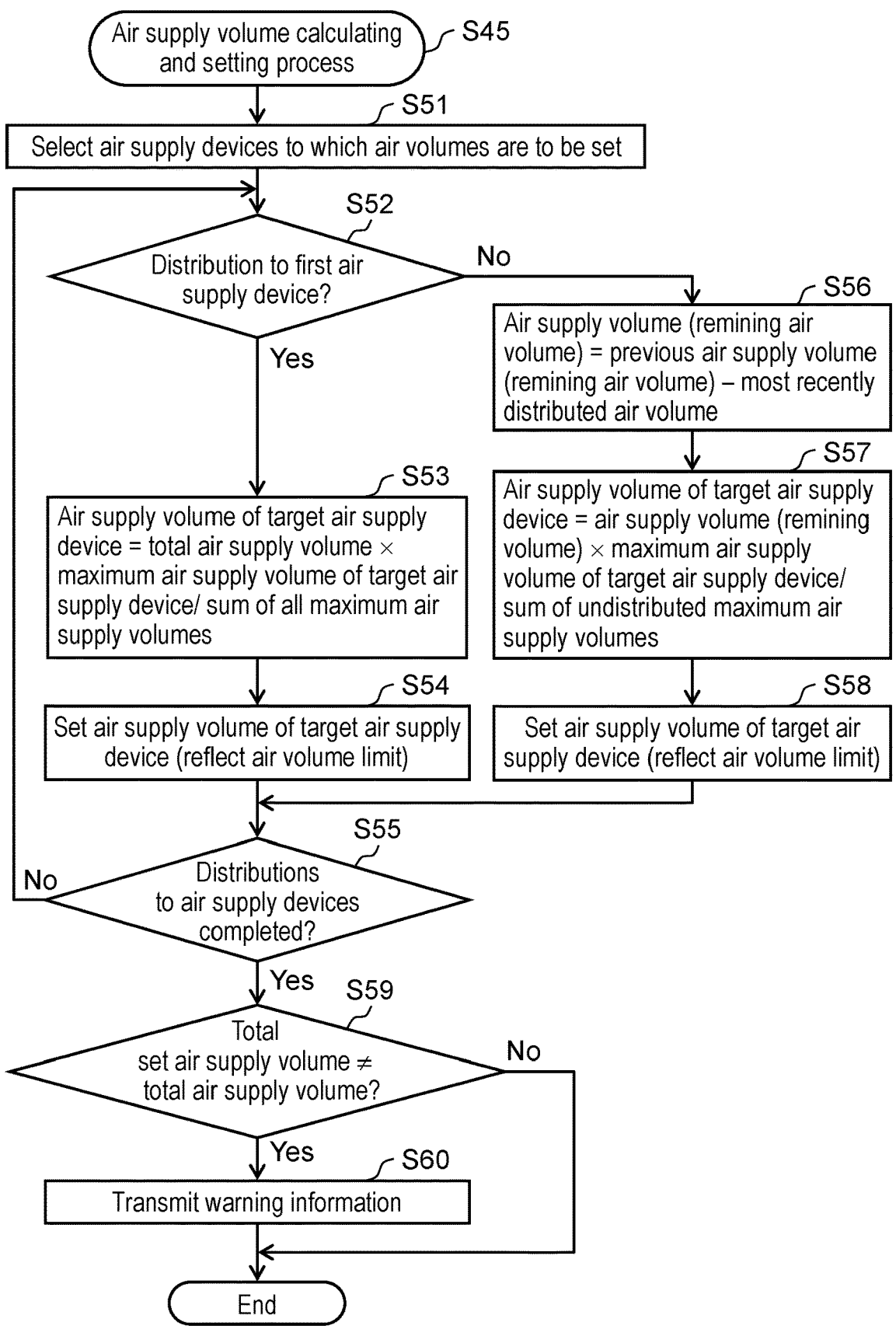
FIG. 8 is a flowchart of an air supply volume calculating and setting process executed by the ventilation control device.

Here, the details of the air supply volume calculating and setting process (S45) will be described with reference to FIG. 8. FIG. 8 is a flowchart of the air supply volume calculating and setting process (S45). Here, the air supply volume calculating and setting process (S45) will be described with an example where the total air supply volume is 320 CFM and the air supply volumes are distributed to two air supply devices α and β. It is assumed that each of air supply devices α and β is capable of outputting the air supply volume in increments of 10 CFM, and that the maximum air supply volume/minimum air supply volume of air supply devices α and β are 200/50 and 150/50, respectively.

In the air supply volume calculating and setting process (S45), ventilation control device 2 first selects air supply devices 4 to which the air supply volumes are to be set, and determines the order that air supply devices 4 are set (S51). Specifically, air supply devices 4 connected to ventilation control device 2 and identified by the processing in S43 in the air supply volume distribution process (FIG. 7) are selected as air supply devices 4 to which the air supply volumes are to be set. Then, the order that air supply devices 4 are set is determined in order of highest maximum air supply volume. In the above example, the air supply volumes are set in order of air supply device α and air supply device β. By distributing the air supply volumes in order of highest maximum air supply volume, when the air supply volumes are distributed to all of air supply devices 4, the possibility that the sum of the distributed air supply volumes is less than the total air supply volume can be reduced. However, in the air supply volume calculating and setting process, it is not always necessary to distribute the air supply volumes in order of highest maximum air supply volume, but the air supply volumes may be distributed to air supply devices 4 in any order.

Next, it is determined whether to distribute the air supply volume to first air supply device 4, that is, whether or not the air supply volume has not yet been distributed to any air supply device 4 (S52). When it is determined that the air supply volume is to be distributed to first air supply device 4 (the air supply volume has not yet been distributed to any air supply device 4) (S52: Yes), then, the air supply volume for first air supply device 4 (air supply device α in the above example) is calculated by the following formula (4), and the total air supply volume is distributed (S53).

Air supply volume of target air supply device 4=total air supply volume×maximum air supply volume of target air supply device 4/sum of all maximum air supply volumes (4)

For example, in the above example, the air supply volume of air supply device α is calculated as follows.

Air supply volume of air supply device α=320×200/350=182.8 CFM

Then, the possible air supply volume of first air supply device 4 which is greater than or equal to and closest to the air supply volume calculated in the processing in S53 is set to the air supply volume to be distributed to first air supply device 4 (S54). For example, in the above example, the air supply volume of air supply device α is set to 190 CFM.

In the processing in S54, when the air supply volume calculated in the processing in S53 exceeds the maximum air supply volume of first air supply device 4, the air supply volume of first air supply device 4 is set to the maximum air supply volume. Moreover, in the processing in S54, when the air supply volume calculated in the processing in S53 is less than the minimum air supply volume of first air supply device 4, the air supply volume of first air supply device 4 is set to the minimum air supply volume. Accordingly, it is possible to prevent the air supply volume that exceeds the capacity range of air supply device 4 from being distributed to air supply device 4. The air supply volume set in the processing in S54 is instructed to target air supply device 4 via exhaust device and air supply device transmitting and receiving unit 29. In other words, the processing in S54 is executed by air supply volume instructor 26.

Note that in the processing in S54, the possible air supply volume of first air supply device 4 which is greater than or equal to and closest to the air supply volume calculated in the processing in S53 is set to the air supply volume to be distributed to first air supply device 4. However, the present disclosure is not limited to such an example. For example, the possible air supply volume of first air supply device 4 which is closest to the air supply volume calculated in the processing in S53 may be set to the air supply volume to be distributed to first air supply device 4. Moreover, the possible air supply volume of first air supply device 4 which is less than or equal to and closest to the air supply volume calculated in the processing in S53 may be set to the air supply volume to be distributed to first air supply device 4.

Next, it is determined whether or not the distributions of the air supply volumes to air supply devices 4 selected in the processing in S51 are completed (S55). When it is not completed (S55: No), the processing returns to S52.

when it is determined, as a result of the determination in S52, that distributions of the air supply volumes to second and subsequent air supply devices 4 are to be performed (the air supply volume has already been distributed to first air supply device 4) (S52: No), the processing proceeds to S56. In the processing in S56, the undistributed air supply volume (remaining air volume) in the total air supply volume is calculated by the following formula (5).

Air supply volume (remaining air volume)=previous air supply volume (remaining air volume)−most recently distributed air volume (5)

Here, the previous air supply volume (remaining air volume) is the sum of the undistributed air supply volumes (remaining air volume) at the time of the previous distribution of the air supply volume, and the most recently distributed air volume is the air supply volume distributed to air supply device 4 just before.

Next, the air supply volume for next distribution target air supply device 4 is calculated by the following formula (6) using the air supply volume (remaining air volume) calculated by the formula (5), and the total air supply volume is distributed (S57).

Air supply volume of target air supply device 4=Air supply volume (remaining air volume)×maximum air supply volume of target air supply device 4/sum of undistributed maximum air supply volumes (6)

Here, the sum of the undistributed maximum air supply volumes is the sum of the maximum air supply volumes of air supply devices 4 to which the air supply volumes have not yet been distributed.

Then, the possible air supply volume of distribution target air supply device 4 which is greater than or equal to and closest to the air supply volume calculated in the processing in S57 is set to the air supply volume to be distributed to target air supply device 4 (S58). Here, in a similar manner to the processing in S54, when the air supply volume calculated in the processing in S57 exceeds the maximum air supply volume of target air supply device 4 or is less than the minimum air supply volume, the air supply volume of target air supply device 4 is set to the maximum air supply volume or the minimum air supply volume. The air supply volume set in the processing in S58 is instructed to target air supply device 4 via exhaust device and air supply device transmitting and receiving unit 29. In other words, the processing in S58 is also executed by air supply volume instructor 26.

Note that, in the processing in S58, in a similar manner to the processing in S54, the possible air supply volume of distribution target air supply device 4 closest to the air supply volume calculated in the processing in S57 may be set to the air supply volume to be distributed to target air supply device 4. Moreover, the possible air supply volume of distribution target air supply device 4 which is less than or equal to and closest to the air supply volume calculated in the processing in S57 may be set to the air supply volume to be distributed to target air supply device 4.

After the processing in S58, the processing proceeds to S55. Then, the processing in S52 to S58 are repeatedly executed until the distributions to all air supply devices 4 selected in the processing in S51 are completed. The processing in S52 to S58 is executed by air supply volume distributor 23.

Here, the processing in S56 to S58 will be described using the above example. When the air supply volume is distributed to air supply device β as second air supply device 4, the air supply volume (remaining air volume) is first calculated in the processing in S56. The undistributed air supply volume at the time of distribution of the air supply volume to first air supply device α is the total air supply volume itself (320 CFM). Since 190 CFM has been distributed to first air supply device α as the air supply volume, the air supply volume (remaining air volume) is as follows.

Air supply volume (remaining air volume)=320−190=130 CFM

In the processing in S57, the air supply volume of second air supply device β is calculated as follows.

Air supply volume of air supply device β=130×150/150=130 CFM

Then, in the processing in S58, the air supply volume of second exhaust device β is set to 130 CFM.

As can be seen from the above formula, when distribution to final distribution target air supply device 4 is performed, in the processing in S57, the air supply volume (remaining air volume) calculated in the processing in S56 is calculated with no change as the air supply volume of final distribution target air supply device 4. Hence, when distribution to final air supply device 4 is performed, it may be that the processing in S57 is skipped after the processing in S56, and the air supply volume (remaining air volume) calculated in the processing in S56 is used in the processing in S58 as the air supply volume calculated for target air supply device 4.

When it is determined, as a result of the determination in S55, that the distributions to all air supply devices 4 selected in the processing in S51 are completed (S55: Yes), then, it is determined whether or not the sum of the air supply volumes set to all air supply devices 4 to which the air supply volumes have been distributed (hereinafter referred to as "total set air supply volume") is different from the total air supply volume (S59).

When low-capacity air supply devices 4 are installed in general housing 1, even if all air supply devices 4 to which the air supply volumes have been distributed are set to the maximum air supply volumes, the total air supply volume may not be reached. Moreover, when high-capacity air supply devices 4 are installed in general housing 1, even if all air supply devices 4 to which the air supply volumes have been distributed are set to the minimum air supply volumes, the total air supply volume may be exceeded. In S59, it is determined whether or not such an event is occurring.

When it is determined, as a result of the determination in S59, that the total set air supply volume is different from the total air supply volume (S59: Yes), warning information indicating such a state is transmitted to input and output terminal 5 via input and output terminal transmitting and receiving unit 28 (S60). Then, the air supply volume calculating and setting process ends. Input and output terminal 5 is capable of informing the user that there is a possibility that desired air supply cannot be performed or air supply more than desired is performed with the air supply capacity of each air supply device 4, by generating a warning sound or displaying a warning screen based on the warning information.

Here, it is preferable that the warning information includes information indicating whether or not the total set air supply volume is less than the total air supply volume. By changing the notification method used by input and output terminal 5 according to the details of the information, it is possible to clearly inform the user whether there is a possibility that desired air supply cannot be performed with the air supply capacity of each air supply device 4 or there is a possibility that air supply more than desired is performed with the air supply capacity of each air supply device 4.

When the total set air supply volume is less than the total air supply volume, each air supply device 4 is instructed to operate at the maximum air supply volume in step S60. Accordingly, when the air supply capacity of each of installed air supply devices 4 is too low, each air supply device 4 is operated at the maximum air supply volume, so that the closest possible air supply to the total air supply volume can be performed. When the total set air supply volume is greater than the total air supply volume, each air supply device 4 is instructed to operate at the minimum air supply volume in the processing in S60. Accordingly, when the air supply capacity of each of installed air supply devices 4 is too high, each air supply device 4 is operated at the minimum air supply volume, so that the closest possible air supply to the total air supply volume can be performed.

In the processing in S60, when the warning information is transmitted to input and output terminal 5, the operation of each air supply device 4 may be stopped. In addition, whether or not to operate each air supply device 4 when the warning information is transmitted to input and output terminal 5 may be selected at the time of installation of ventilation control device 2 or by user settings.

Moreover, in the processing in S59, it may be that only whether or not the total set air supply volume is less than the total air supply volume is determined and when the total set air supply volume is less than the total air supply volume, warning information is transmitted to input and output terminal 5 to instruct each air supply device 4 to operate at the maximum exhaust air volume. Even when the total set air supply volume is greater than the total air supply volume, balanced ventilation can be performed by controlling the actual air supply volume of each air supply device 4 according to the actual exhaust air volume of each exhaust device 3, and a warning is not always necessary.

When it is determined, as a result of the processing of S59, that the total set air supply volume is equal to the total air supply volume (S59: No), the air supply volume calculating and setting process ends. As described above, setting information, which invalidates the notification that there is a possibility that desired air supply cannot be performed or air supply more than desired is performed with the air supply capacity of each air supply device 4, is stored in storage 11, in the processing in S60, the warning information is not transmitted to input and output terminal 5, and each air supply device 4 is instructed to operate at the maximum air supply volume or the minimum air supply volume according to the magnitude relationship between the total set air supply volume and the total air supply volume.

As described above, in ventilation control device 2 and ventilation system 40 according to the first embodiment, the exhaust air volume of each exhaust device 3 is set by distributing the total exhaust air volume set to general housing 1 according to the maximum exhaust air volume of each exhaust device 3. Accordingly, the exhaust air volume is set in a balanced manner according to the capacity of each exhaust device 3. As a result, the energy saving operation of ventilation system 40 can be achieved. Moreover, the total air supply volume is set based on the sum of the actual exhaust air volumes of exhaust devices 3, and the air supply volume of each air supply device 4 is set by distributing the total air supply volume according to the maximum air supply volume of air supply device 4. This allows the exhaust air volume to be set in a balanced manner according to the capacity of each air supply device 4. Hence, the energy saving operation of ventilation system 40 can be achieved in view of air supply as well.

Since the total air supply volume is set based on the sum of the actual exhaust air volumes of exhaust devices 3, exhaust and air supply can be controlled in a balanced manner.

Moreover, since the exhaust air volume or the air supply volume of each exhaust device 3 and each air supply device 4 connected to ventilation control device 2 can be automatically distributed and set, the builder, the building contractor etc. of the building does not have to individually set the exhaust air volume or the air supply volume to each exhaust device 3 and each air supply device 4. This eliminates the need for complicated settings.

Second Embodiment

Next, ventilation control device 2 and ventilation system 40 according to a second embodiment will be described with reference to FIG. 9 to FIG. 16. In ventilation control device 2 according to the first embodiment, the case has been described where the total exhaust air volume set to general housing 1 is distributed to a plurality of exhaust devices 3 installed, and the sum of the actual exhaust air volumes is distributed to a plurality of air supply devices 4 as the total air supply volume. In contrast, in ventilation control device 2 according to the second embodiment, exhaust devices 3 and air supply devices 4 installed in general housing 1 are divided into a plurality of groups. Ventilation control device 2 according to the second embodiment first distributes the total exhaust air volume set to general housing 1 to each group, and within each group, the distributed exhaust air volume is further distributed to exhaust devices 3 included in the group. Moreover, ventilation control device 2 according to the second embodiment sets, for each group, the sum of the actual exhaust air volumes of exhaust devices 3 included in the group to the total air supply volume of the group, and distributes the total air supply volume set to the group to air supply devices 4 included in the group.

Hereinafter, ventilation control device 2 and ventilation system 40 according to the second embodiment will be described focusing on differences from ventilation control device 2 and ventilation system 40 according to the first embodiment. The structural elements which are the same as ventilation control device 2 and ventilation system 40 according to the first embodiment share like reference signs, and description of such elements are omitted.

Figure 9:
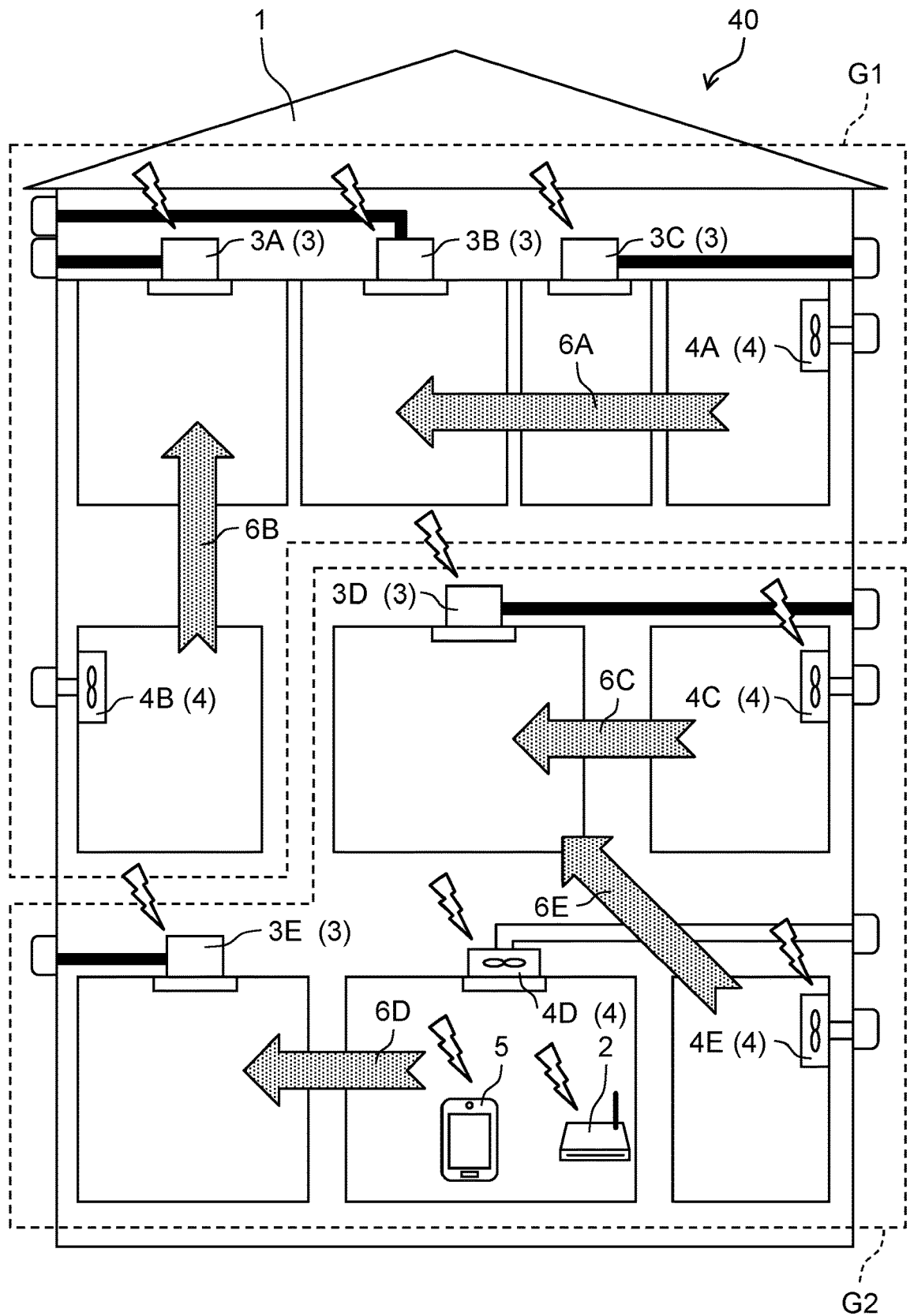
FIG. 9 is a schematic diagram of connection of a ventilation system according to a second embodiment of the present disclosure.

FIG. 9 is a schematic diagram of connection of ventilation system 40 according to the second embodiment. In ventilation system 40 illustrated in FIG. 9, five exhaust devices 3A to 3E (referred to as "exhaust device 3" when an arbitrary exhaust device is indicated) and five air supply devices 4A to 4E (referred to as "air supply device 4" when an arbitrary air supply device is indicated) are installed in general housing 1. Exhaust devices 3A to 3E and air supply devices 4A to 4E are divided into two groups G1 and G2. In the example of FIG. 9, group G1 includes exhaust devices 3A to 3C and air supply devices 4A and 4B, and group G2 includes exhaust devices 3D and 3E and air supply devices 4C to 4E. The grouping is performed by grouping unit 52 (FIG. 10) included in ventilation control device 2 to be described later.

Here, when the building has a structure with a plurality of floors or a certain closed space, air paths are formed in each floor or closed space. For example, air paths 6A and 6B are formed between exhaust devices 3A to 3C and air supply devices 4A and 4B, and air paths 6C to 6E are formed between exhaust devices 3D and 3E and air supply devices 4C to 4E.

Ventilation control device 2 then groups exhaust devices 3 and air supply devices 4 for each floor or each space, and sets the exhaust air volume or the air supply volume of each of exhaust devices 3A to 3E and each of air supply devices 4A to 4E such that exhaust and air supply are balanced within each group. Accordingly, the air path design from the air supply space to the exhaust space can be facilitated even in each floor or closed space.

Figure 10:
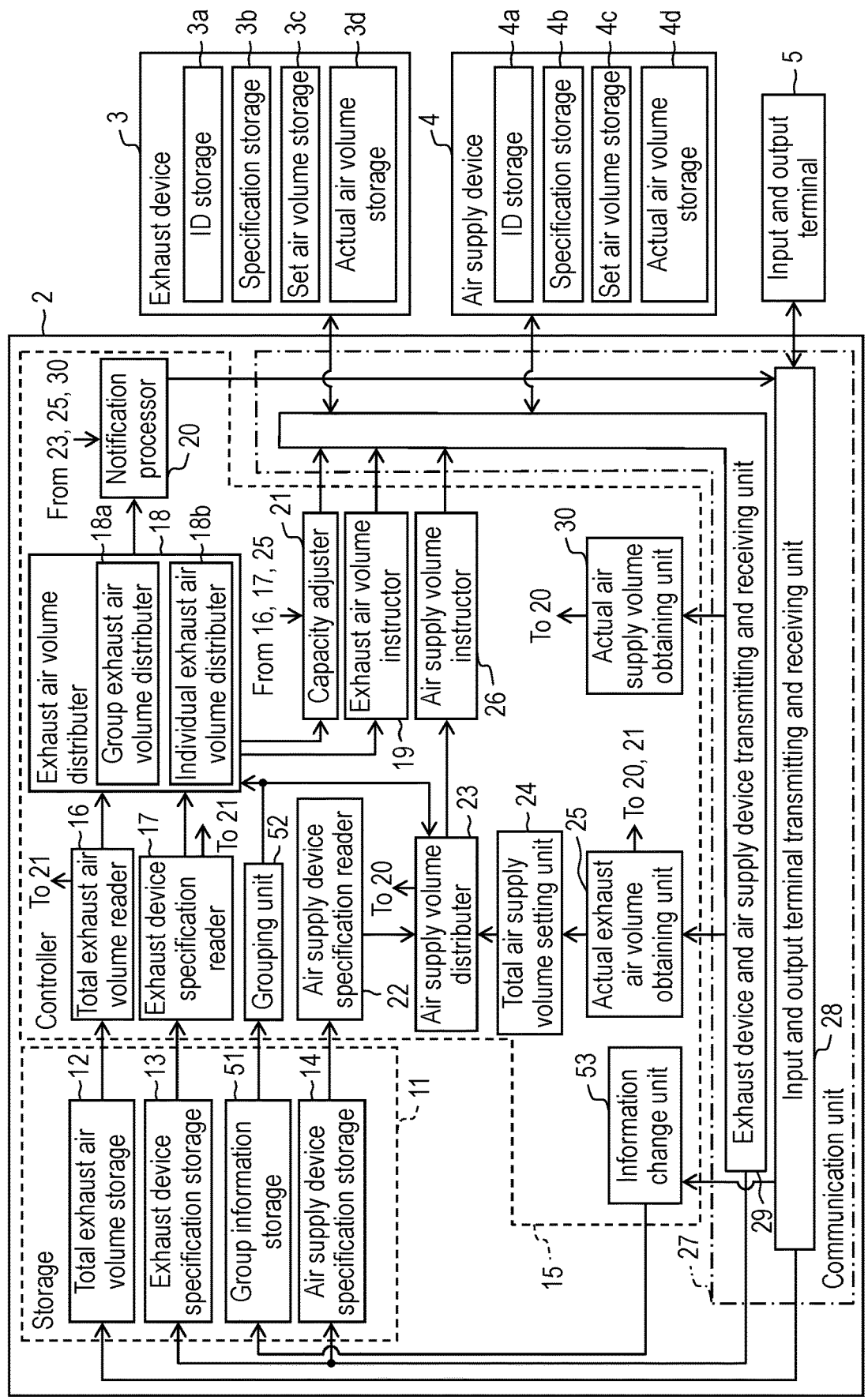
FIG. 10 is a schematic functional block diagram of a ventilation control device according to the second embodiment of the present disclosure.

Next, each function of ventilation control device 2 according to the second embodiment will be described with reference to FIG. 10. FIG. 10 is a schematic functional block diagram of ventilation control device 2.

Ventilation control device 2 according to the second embodiment is different from ventilation control device 2 according to the first embodiment in that storage 11 includes group information storage 51, controller 15 includes grouping unit 52 and information change unit 53, and exhaust air volume distributer 18 includes group exhaust air volume distributer 18a and individual exhaust air volume distributer 18b. Moreover, the processing performed by air supply volume distributer 23 and total air supply volume setting unit 24 are also different between the first embodiment and the second embodiment.

Group information storage 51 stores, in association with group identification information for identifying the groups into which exhaust devices 3A to 3E and air supply devices 4A to 4E are divided, identification information of exhaust devices and air supply devices included in the corresponding group. In other words, group information storage 51 stores information indicating a correspondence relationship between each exhaust device 3 and each air supply device 4 and a group including exhaust device 3 and air supply device 4.

Grouping unit 52 divides exhaust devices 3A to 3E and air supply devices 4A to 4E into a plurality of groups based on the information stored in group information storage 51. For example, if identification information of exhaust devices 3A to 3C and air supply devices 4A and 4B is stored in group information storage 51 in association with the identification information of group G1, exhaust devices 3A to 3C and air supply devices 4A and 4B are included in group G1. Moreover, if identification information of exhaust devices 3D and 3E and air supply devices 4C to 4E is stored in group information storage 51 in association with the identification information of group G2, exhaust devices 3D and 3E and air supply devices 4C to 4E are included in group G2.

Figure 11:
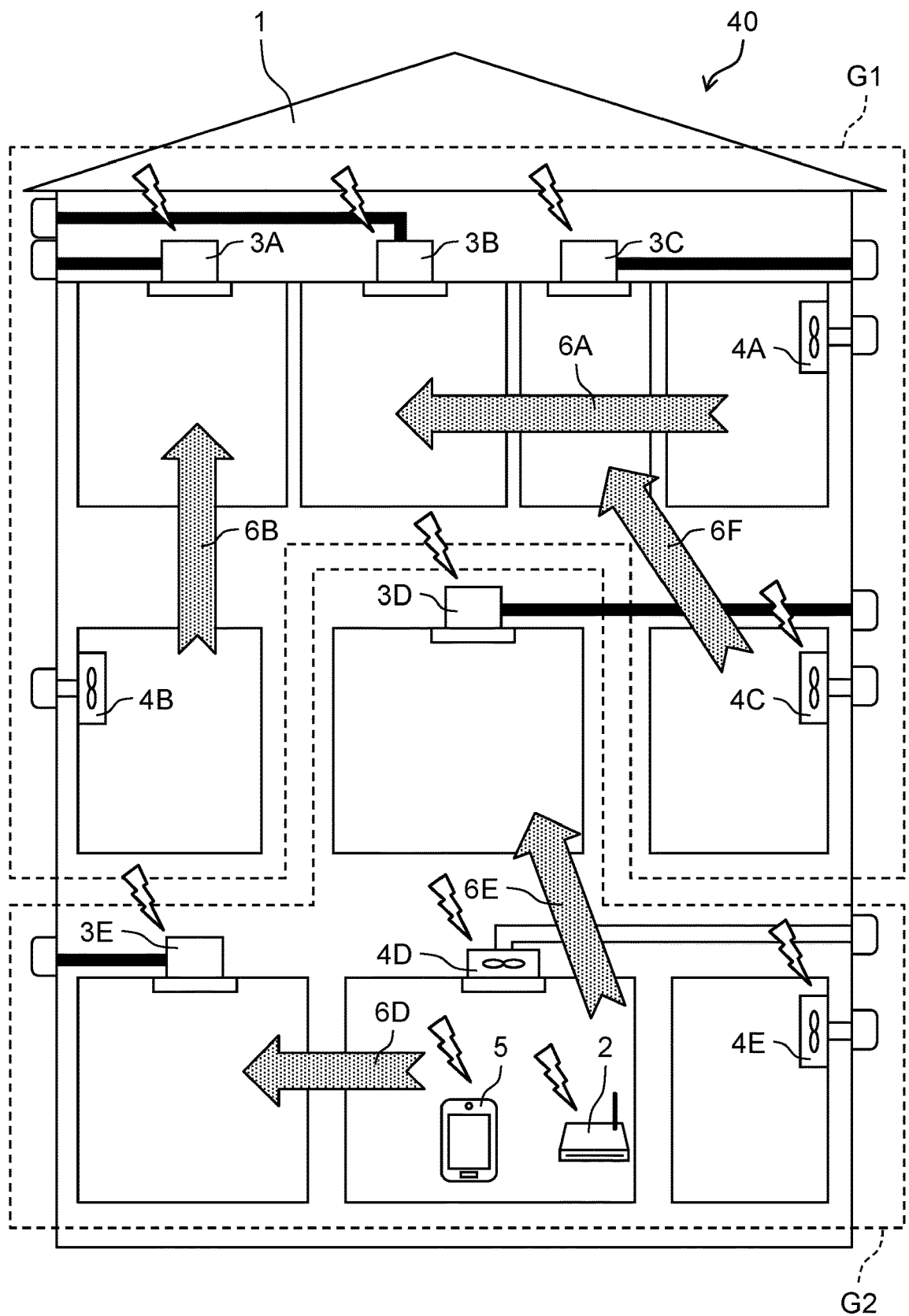
FIG. 11 is a schematic diagram of connection of the ventilation system.

Information change unit 53 changes the information stored in group information storage 51. For example, the closed space in general housing 1 may be changed by, for example, providing a new wall in general housing 1 or removing a wall from general housing 1. In such a case, it is necessary to change the air path design within general housing 1. For example, as illustrated in FIG. 11, it may be that the group of air supply device 4C is changed from group G2 to group G1, and that new air path 6F is formed instead of air path 6C.

In preparation for such a case, ventilation control device 2 according to the second embodiment is capable of, for example, increasing the number of groups into which exhaust devices 3A to 3E and air supply devices 4A to 4E are divided, and changing exhaust devices 3A to 3E and air supply devices 4A to 4E included in each group. In addition, when a new exhaust device or a new air supply device is installed, the grouping can be reset.

The initial setting or change of information stored in group information storage 51 is performed by input and output terminal 5. Then, the information is transmitted from input and output terminal 5 to controller 15 via input and output terminal transmitting and receiving unit 28, and group information storage 51 is rewritten by information change unit 53 according to the change details indicated by the information, so that the initial setting or change of the grouping of exhaust devices 3A to 3E and air supply devices 4A to 4E can be performed.

Referring back to FIG. 10, group exhaust air volume distributer 18a of exhaust air volume distributer 18 distributes the total exhaust air volume read by total exhaust air volume reader 16 to each group. Specifically, the total exhaust air volume is distributed to each group according to the sum of the maximum exhaust air volumes of exhaust devices 3 included in each group, and the distributed exhaust air volume is set to the air volume to be exhausted by the group. Details of group exhaust air volume distributer 18a will be described later with reference to FIG. 13.

Individual exhaust air volume distributer 18b of exhaust air volume distributer 18 distributes, within each group, the exhaust air volume of each group distributed by group exhaust air volume distributer 18a, to exhaust devices 3 included in the group. Specifically, in each group, the exhaust air volume distributed to the group is distributed according to the maximum exhaust air volume of each exhaust device 3 included in the group, and the distributed exhaust air volume is set to the air volume of exhaust device 3. Details of individual exhaust air volume distributer 18b will be described later with reference to FIG. 14.

Total air supply volume setting unit 24 according to the second embodiment sets, for each group, the sum of the actual exhaust air volumes of exhaust devices 3 included in the group to the total air supply volume of the group.

In addition, air supply volume distributer 23 according to the second embodiment sets, for each group, the air supply volume of each air supply device 4 included in the group, by distributing the total air supply volume of the group set by total air supply volume setting unit 24 according to the maximum air supply volume of each air supply device 4 included in the group.

Figure 12:
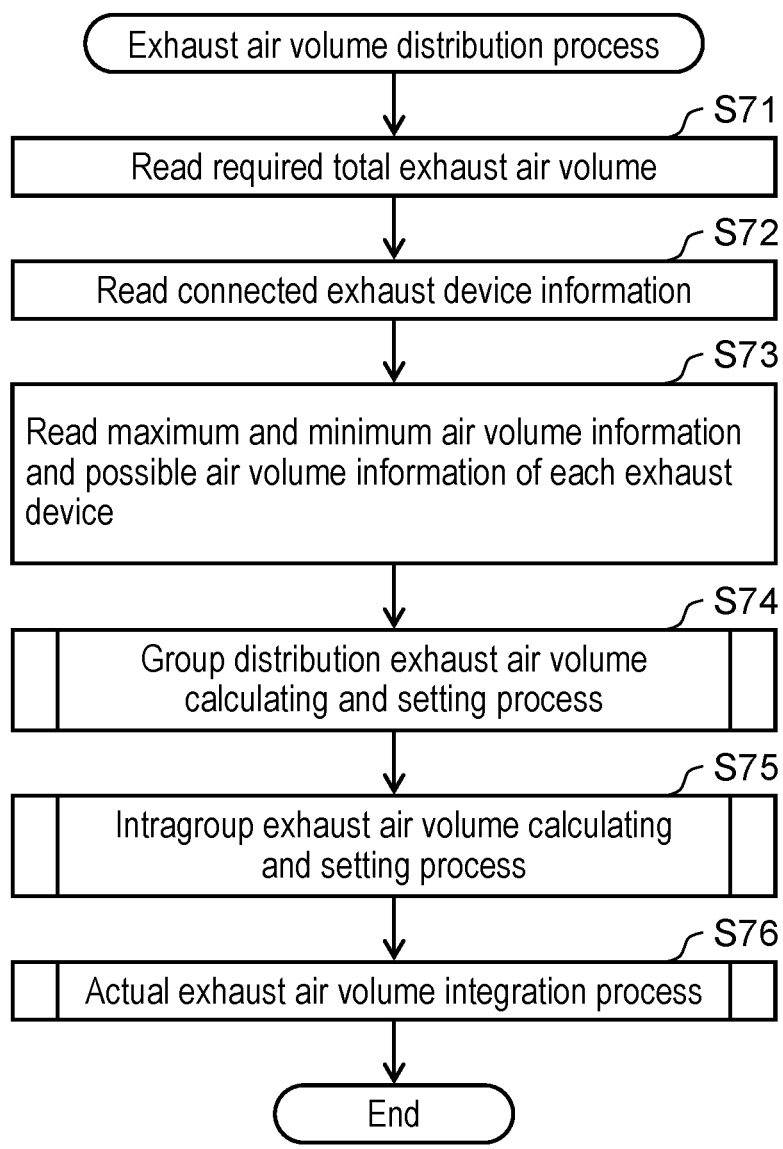
FIG. 12 is a flowchart of an exhaust air volume distribution process executed by the ventilation control device.

Next, an exhaust air volume distribution process executed by CPU 31 of ventilation control device 2 according to the second embodiment will be described with reference to FIG. 12. FIG. 12 is a flowchart of the exhaust air volume distribution process. The exhaust air volume distribution process is executed at the same timing as the exhaust air volume distribution process according to the first embodiment, and is also executed when information stored in group information storage 51 is changed.

In the exhaust air volume distribution process according to the second embodiment, first, the processes similar to S11 to S13 of the exhaust air volume distribution process (FIG. 4) according to the first embodiment are executed in S71 to S73. Then, a group distribution exhaust air volume calculating and setting process is executed (S74), and an intragroup exhaust air volume calculating and setting process is further executed (S75). Subsequently, an actual exhaust air volume integration process similar to S15 of the exhaust air volume distribution process (FIG. 4) according to the first embodiment is executed (S76), and the exhaust air volume distribution process ends.

Figure 13:
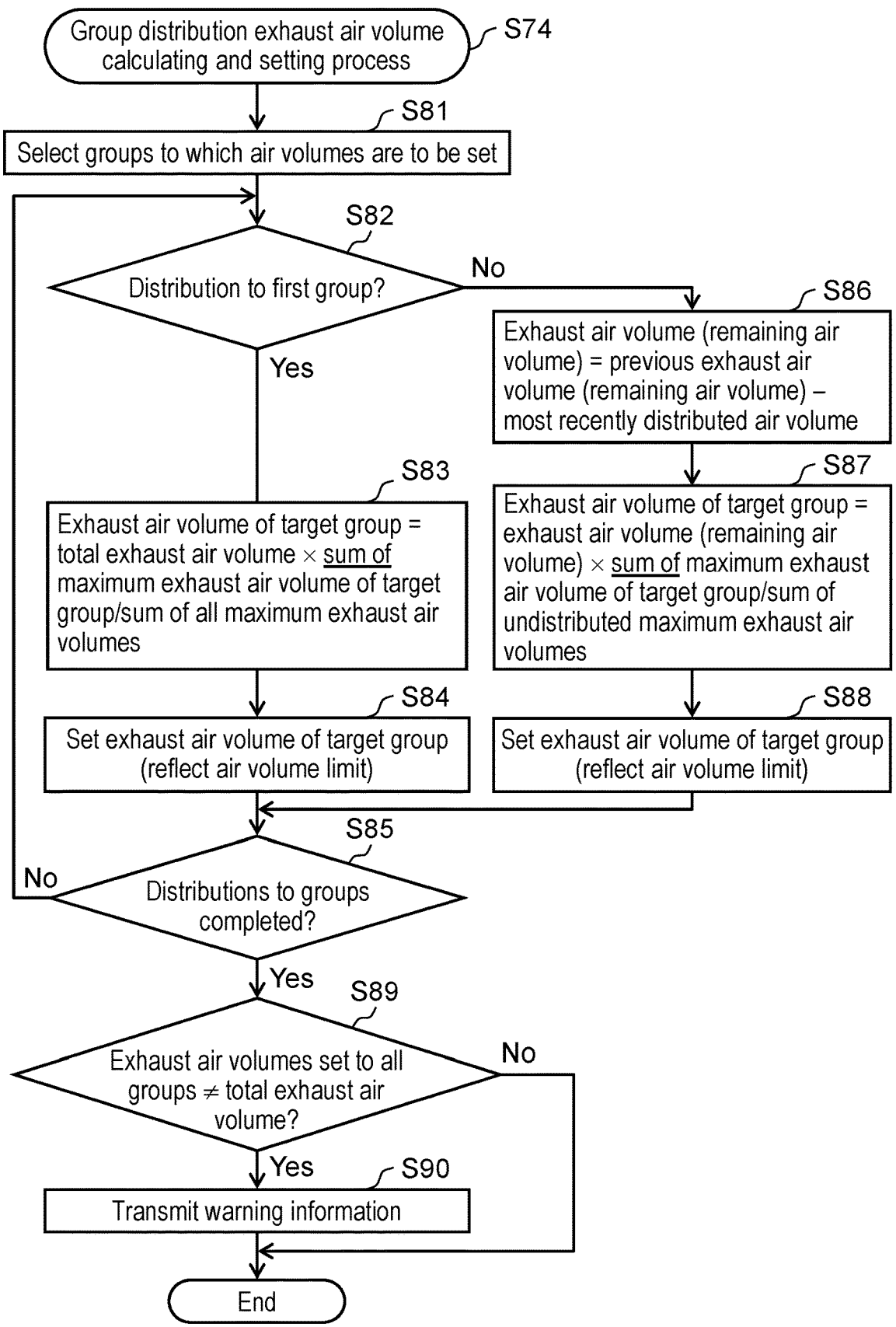
FIG. 13 is a flowchart of a group distribution exhaust air volume calculating and setting process executed by the ventilation control device.

Here, details of the group distribution exhaust air volume calculating and setting process (S74) will be described with reference to FIG. 13. FIG. 13 is a flowchart of the group distribution exhaust air volume calculating and setting process (S74). The group distribution exhaust air volume calculating and setting process (S74) is a process for distributing the total exhaust air volume set to general housing 1 to each group.

Here, the group distribution exhaust air volume calculating and setting process (S74) will be described with an example where the total exhaust air volume set to general housing 1 is 500 CFM, and the exhaust air volumes are distributed to two groups G1 and G2 illustrated in FIG. 9. It is assumed that group G1 includes exhaust devices 3A to 3C, and group G2 includes exhaust devices 3D and 3E. It is assumed that each of exhaust devices 3A to 3E is capable of outputting the exhaust air volume in increments of 10 CFM, and that the maximum exhaust air volume/minimum exhaust air volume of exhaust devices 3A to 3E are 200/50, 150/50, 80/30, 150/50, and 100/30, respectively.

In a similar manner to the first embodiment, the total exhaust air volume read by total exhaust air volume reader 16 is the total air volume to be exhausted from a predetermined building within a predetermined length of time. In contrast, in the group distribution exhaust air volume calculating and setting process (S74) and the intragroup exhaust air volume calculating and setting process (S75), the volume of air to be exhausted per minute is set to each exhaust device 3 as the exhaust air volume. Accordingly, as the total exhaust air volume distributed to each exhaust device 3, the volume, obtained by converting the total exhaust air volume read by total exhaust air volume reader 16 into the total volume of air to be exhausted per minute, is used in the group distribution exhaust air volume calculating and setting process (S74).

In the group distribution exhaust air volume calculating and setting process (S74), first, groups to which the exhaust air volumes are to be set are selected, and the order that the groups are set is determined (S81). Specifically, the groups stored in group information storage 51 are selected as groups to which the exhaust air volumes are to be set, and the order that the groups are set is determined in order of highest sum of the maximum exhaust air volumes of exhaust devices 3 included in each group. In the above example, since the sum of the maximum exhaust air volumes of group G1 is 430, and the sum of the maximum exhaust air volumes of group G2 is 250, the exhaust air volumes are set in order of group G1 and group G2.

Distribution of the exhaust air volume to each group in order of highest sum of the maximum exhaust air volumes reduces the possibility that the sum of the distributed exhaust air volumes does not reach the total exhaust air volume when the exhaust air volumes are distributed to all group. However, in the group distribution exhaust air volume calculating and setting process, it is not always necessary to distribute the exhaust air volume to each group in order of highest sum of the maximum exhaust air volumes, but the exhaust air volume may be distributed to each group in any order.

Next, it is determined whether or not to distribute the exhaust air volume to the first group, that is, whether or not the exhaust air volume has not yet been distributed to any group (S82). When it is determined that the exhaust air volume is to be distributed to the first group (the exhaust air volume has not yet been distributed to any group) (S82: Yes), then the exhaust air volume for the first group (group G1 in the above example) is calculated by the following formula (7), and the total exhaust air volume is distributed (S83).

$$\text{Exhaust air volume of target group} = \text{total exhaust air volume} \times \text{sum of maximum exhaust air volumes in target group} / \text{sum of all maximum exhaust air volumes} \quad (7)$$

For example, in the above example, the exhaust air volume of group G1 is calculated as follows.

$$\text{Exhaust air volume of group G1} = 500 \times 430/680 = 316.2 \text{ CFM}$$

Then, the possible exhaust air volume in the first group which is greater than or equal to and closest to the exhaust air volume calculated in the processing in S83 is set to the exhaust air volume to be distributed to the first group (S84). For example, in the above example, the exhaust air volume of group G1 is set to 320 CFM.

In the processing in S84, when the exhaust air volume calculated in the processing in S83 exceeds the sum of the maximum exhaust air volumes of the first group, the exhaust air volume of the first group is set to the sum of the maximum exhaust air volumes. Moreover, in the processing in S84, when the exhaust air volume calculated in the processing in S83 is less than the sum of the minimum exhaust air volumes of the first group, the exhaust air volume of the first group is set to the sum of the minimum exhaust air volume. As a result, it is possible to prevent the exhaust air volume that exceeds the capacity range of exhaust device 3 from being distributed to exhaust device 3.

In the processing in S84, the possible exhaust air volume of the first group which is greater than or equal to and closest to the exhaust air volume calculated in the processing in S83 is set to the exhaust air volume to be distributed to the first group. However, the present disclosure is not limited to such an example. For example, the possible exhaust air volume of the first group which is closest to the exhaust air volume calculated in the processing in S83 may be set to the exhaust air volume to be distributed to the first group. Moreover, the possible exhaust air volume of the first group which is less than or equal to and closest to the exhaust air volume calculated in the processing in S83 may be set to the exhaust air volume to be distributed to the first group.

Next, it is determined whether or not the distributions of the exhaust air volumes to the groups selected in the processing in S81 are completed (S85). When it is not completed yet (S85: No), the processing returns to the processing in S82.

When it is determined, as a result of the determination in S82, that the exhaust air volumes are to be distributed to the second and subsequent groups (the exhaust air volume has already been distributed to the first group) (S22: No), the processing proceeds to S86. In the processing in S86, the undistributed exhaust air volume (remaining air volume) in the total exhaust air volume is calculated by the following formula (8).

$$\text{Exhaust air volume (remaining air volume)} = \text{previous exhaust air volume (remaining air volume)} - \text{most recently distributed air volume} \quad (8)$$

Here, the previous exhaust air volume (remaining air volume) is the sum of the undistributed exhaust air volumes (remaining air volume) at the time of the previous distribution of the exhaust air volume, and the most recently distributed air volume is the exhaust air volume distributed to the group just before.

Next, the exhaust air volume for the next distribution target group is calculated by the following formula (9) using the exhaust air volume (remaining air volume) calculated by the formula (8), and the total exhaust air volume is distributed.

$$\text{Exhaust air volume of target group} = \text{Exhaust air volume (remaining air volume)} \times \text{sum of maximum exhaust air volumes of target group} / \text{sum of undistributed maximum exhaust air volumes} \quad (9)$$

Here, the sum of the undistributed maximum exhaust air volumes is the sum of the maximum exhaust air volumes in the groups to which the exhaust air volumes have not yet been distributed.

Then, the possible exhaust air volume of the target group which is greater than or equal to and closest to the exhaust air volume calculated in the processing in S87 is set to the exhaust air volume to be distributed to the target group (S88). At this time, in a similar manner to the processing in S84, when the exhaust air volume calculated in the processing in S87 exceeds the sum of the maximum exhaust air volumes of the target group or less than the sum of the minimum exhaust air volumes of the target group, the exhaust air volume of the target group is set to the sum of the maximum exhaust air volumes or the sum of the minimum exhaust air volumes.

After the processing in S88, the processing proceeds to S85. The processing in S82 to S88 are repeatedly executed until the distributions to all the groups selected in the processing in S81 are completed. The processing in S82 to S88 is executed by group exhaust air volume distributor 18a.

Here, the processing in S86 to S88 will be described using the above example. When the exhaust air volume of group G2 as the second group is distributed, the exhaust air volume (remaining air volume) is first calculated in the processing in S26. The undistributed exhaust air volume at the time of distribution of the exhaust air volume to first group G1 is the total exhaust air volume itself (500 CFM). Since 320 CFM has been distributed to first group G1 as the exhaust air volume, the exhaust air volume (remaining air volume) is as follows.

$$\text{Exhaust air volume (remaining air volume)} = 500 - 320 = 180 \text{ CFM}$$

In the processing in S87, the exhaust air volume of second group G2 is calculated as follows.

$$\text{Exhaust air volume of group G2} = 180 \times 250/250 = 180 \text{ CFM}$$

In the processing in S88, the exhaust air volume of second group G2 is set to 180 CFM.

As can be seen from the above formula, in the processing in S87, when distribution is to be performed on the final distribution target group, the exhaust air volume (remaining air volume) calculated in the processing in S86 is calculated as the exhaust air volume of the final distribution target group. Accordingly, when distribution is to be performed on the final group, it may be that the processing in S87 is skipped after the processing in S86, and that the processing proceeds to S88 where the exhaust air volume (remaining air volume) calculated in the processing in S86 is used as the exhaust air volume calculated for the distribution target group.

When it is determined, as a result of the determination in S85, that the distributions to all groups selected in the processing in S81 are completed (S85: Yes), then it is determined whether or not the sum of the exhaust air volumes set to all groups to which the exhaust air volumes have been distributed (hereinafter, referred to as "exhaust air volumes set to all groups") is different from the total exhaust air volume (S89).

When low-capacity exhaust devices 3 are installed in general housing 1, the total exhaust air volume may not be reached even if the settable maximum exhaust air volumes are distributed to all the groups. In contrast, when high-capacity exhaust devices 3 are installed in general housing 1, the total exhaust air volume may be exceeded even if the settable minimum exhaust air volumes are distributed to all groups. In S89, it is determined whether or not such an event is occurring.

When it is determined, as a result of the determination in S89, that the exhaust air volumes set to all groups are different from the total exhaust air volume (S89: Yes), warning information indicating such a state is transmitted to input and output terminal 5 via input and output terminal transmitting and receiving unit 28 (S90). Then, the group distribution exhaust air volume calculating and setting process ends. The processing in S90 is executed by notification processor 20. Input and output terminal 5 is capable of informing the user that there is a possibility that desired exhaust cannot be performed or exhaust more than desired is performed with the exhaust capacity of the group, by generating a warning sound or displaying a warning screen based on the warning information.

Here, it is preferable that the warning information includes information indicating whether or not the exhaust air volumes set to all groups are less than the total exhaust air volume. By changing the notification method used by input and output terminal 5 according to the details of the information, it is possible to clearly inform the user that there is a possibility that desired exhaust cannot be performed with the exhaust capacity of the group or there is a possibility that exhaust more than desired is performed with the exhaust capacity of the group.

Moreover, when the exhaust air volumes set to all groups are less than the total exhaust air volume, in the processing in S90, the sum of the maximum exhaust air volumes of exhaust devices 3 included in each group is distributed to the group. Accordingly, when the exhaust capacity of each of installed exhaust devices 3 is too low, each group is operated at the maximum exhaust air volume, so that the closest possible exhaust to the total exhaust air volume can be performed. Moreover, when the exhaust air volumes set to all groups are greater than the total exhaust air volume, in the processing in S90, the sum of the minimum exhaust air volumes of exhaust devices 3 included in each group is distributed to the group. Accordingly, when the exhaust capacity of each of installed exhaust devices 3 is too high, each group is operated at the minimum exhaust air volume, so that the closest possible exhaust to the total exhaust air volume can be performed.

In the processing in S90, when warning information is transmitted to input and output terminal 5, the operation of each exhaust device 3 may be stopped. In addition, when warning information is transmitted to input and output terminal 5, whether or not to operate each exhaust device 3 may be selected at the time of installation of ventilation control device 2 or by user settings.

Moreover, in the processing in S89, when only whether or not the exhaust air volumes set to all groups is less than the total exhaust air volume is determined and when the exhaust air volumes set to all groups are less than the total exhaust air volume, it may be that the warning information is transmitted to input and output terminal 5, and the sum of the maximum exhaust air volumes of exhaust devices 3 included in each group may be distributed to the group. When the exhaust air volumes set to all groups are greater than the total exhaust air volume, the operation of each exhaust device 3 is stopped when the exhaust air volume actually exhausted by each exhaust device 3 (integrated air volume) reaches the total exhaust air volume, and warning is not always required.

When it is determined, as a result of the processing of S89, that the exhaust air volumes set to all groups are equal to the total exhaust air volume (S89: No), the group distribution exhaust air volume calculating and setting process ends. In a similar manner to the first embodiment, storage 11 may store setting information which invalidates the notification that there is a possibility that the desired exhaust cannot be performed or exhaust more than desired is performed with the exhaust capacity of the group. When the setting information which invalidates the notification is stored, in the processing in S90, the warning information is not transmitted to input and output terminal 5, and the sum of the maximum exhaust air volumes or the sum of the minimum exhaust air volumes of exhaust devices 3 included in each group is distributed to the group according to the magnitude relationship between the exhaust air volumes set to all groups and the total exhaust air volume.

Figure 14:
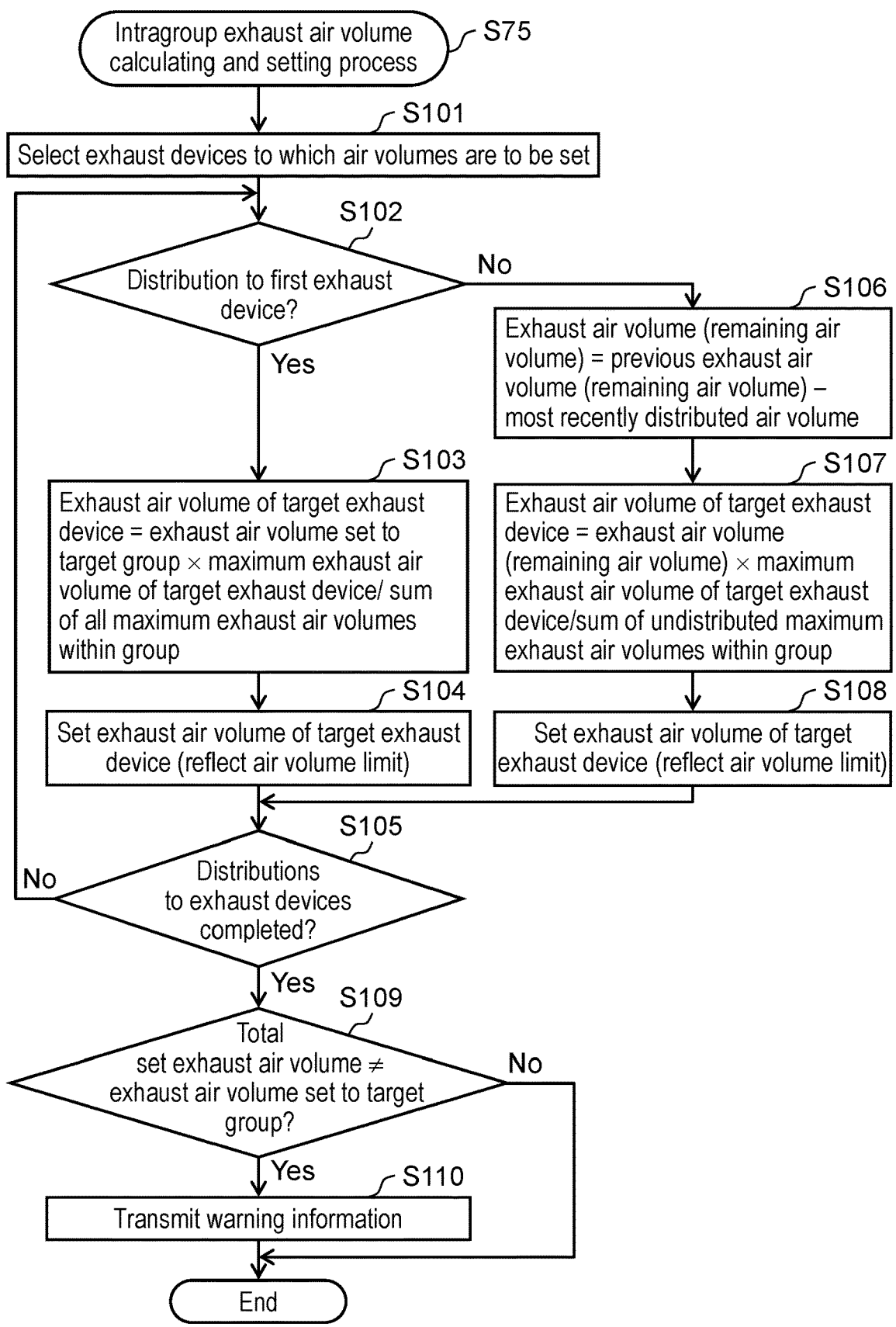
FIG. 14 is a flowchart of an intragroup exhaust air volume calculating and setting process executed by the ventilation control device.

Next, the intragroup exhaust air volume calculating and setting process (S75) will be described with reference to FIG. 14. FIG. 14 is a flowchart of the intragroup exhaust air volume calculating and setting process (S75). The processing in S101 to S110 of the intragroup exhaust air volume calculating and setting process (S75) are the same as S21 to S30 of the exhaust air volume calculating and setting process (S14) (see FIG. 5) according to the first embodiment.

The intragroup exhaust air volume calculating and setting process (S75) is executed for each group. In the intragroup exhaust air volume calculating and setting process, the exhaust air volume of the group distributed in the group distribution exhaust air volume calculating and setting process (S74) is distributed to each exhaust device 3 included in the group according to the maximum exhaust air volume of exhaust device 3. Then, the intragroup distribution exhaust air volume calculating and setting process (S75) is executed for all the groups, and the exhaust air volumes are distributed to all exhaust devices 3 connected to ventilation control device 2.

Figure 15:
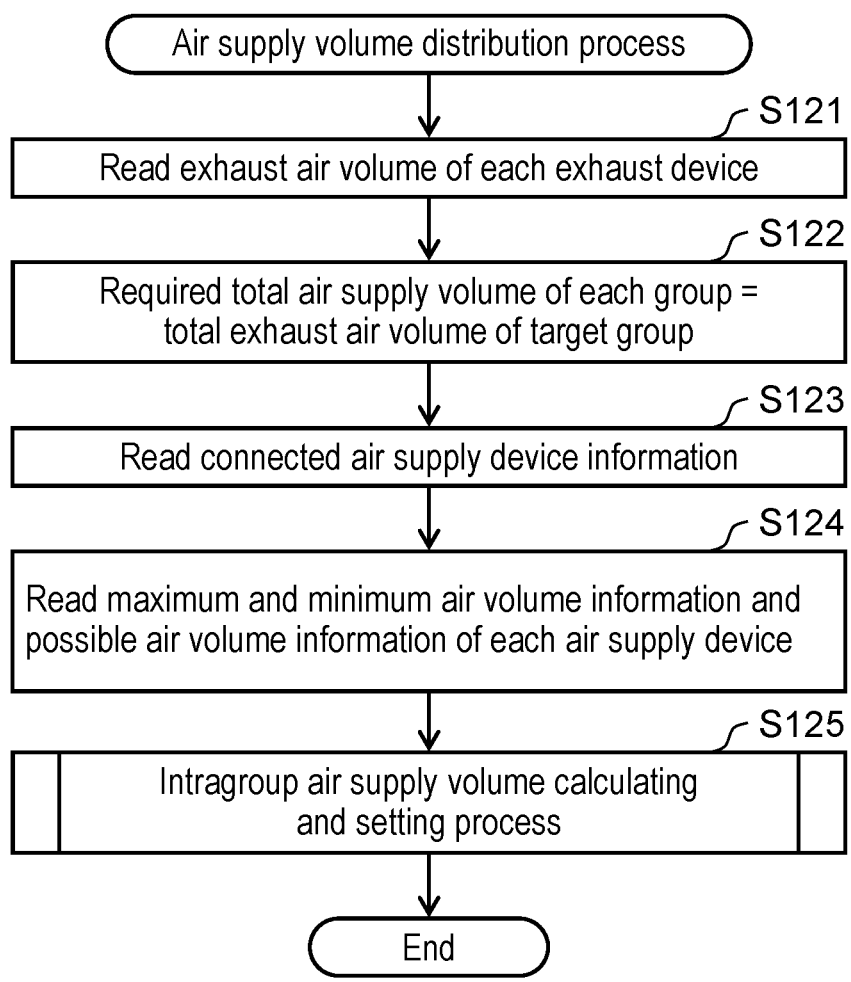
FIG. 15 is a flowchart of an air supply volume distribution process executed by the ventilation control device.

Next, details of the air supply volume distribution process executed by CPU 31 of ventilation control device 2 according to the second embodiment will be described with reference to FIG. 15. FIG. 15 is a flowchart of the air supply volume distribution process. The air supply volume distribution process is executed at the same timing as the air supply volume distribution process according to the first embodiment.

In the air supply volume distribution process according to the second embodiment, first, the process similar to S41 of the air supply volume distribution process (FIG. 7) according to the first embodiment is executed in S121. Then, the sum of the actual exhaust air volumes of exhaust devices 3 included in each group is set to a required total air supply volume of the group (S122). In other words, for each group, the air supply volumes of air supply devices 4 included in the group are distributed with the sum of the actual exhaust air volumes of exhaust devices 3 included in the group as the required total air supply volume of the group. This makes it possible to control exhaust and air supply in a balanced manner within each group, and to facilitate air path design from the air supply space to the exhaust space within the group set according to each floor and enclosed space.

Next, processes similar to S43 and S44 of the air supply volume distribution process (FIG. 7) according to the first embodiment are executed in S123 and S124. Then, the intragroup air supply volume calculating and setting process (S125) is executed, and the air supply volume distribution process ends.

Figure 16:
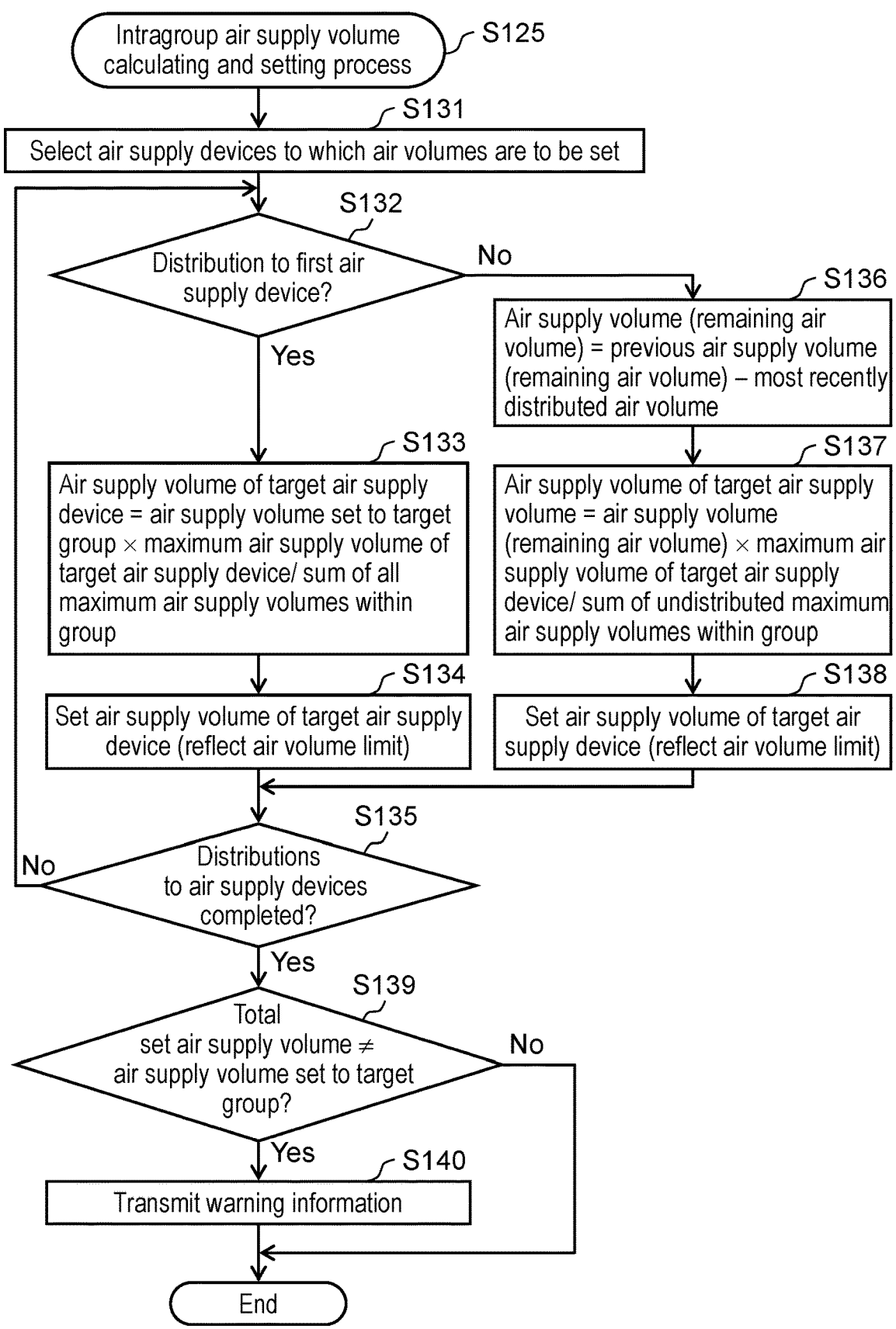
FIG. 16 is a flowchart of an intragroup air supply volume calculating and setting process executed by the ventilation control device.

Next, the intragroup air supply volume calculating and setting process (S125) will be described with reference to FIG. 16. FIG. 16 is a flowchart of the intragroup air supply volume calculating and setting process (S125). The processes S131 to S140 of the intragroup air supply volume calculating and setting process (S125) are the same as S51 to S60 of the air supply volume calculating and setting process (S45) (see FIG. 8) according to the first embodiment.

The intragroup air supply volume calculating and setting process (S125) is executed for each group. In the intragroup air supply volume calculating and setting process, the total air supply volume of the group set in the processing in S122 of the air supply volume distribution process (FIG. 15) is distributed to each air supply device 4 included in the group according to the maximum air supply volume of air supply device 4. Then, the intragroup air supply volume calculating and setting process (S125) is executed for all groups, and the air supply volumes are distributed to all air supply devices 4 connected to ventilation control device 2.

As described above, in ventilation control device 2 according to the second embodiment, exhaust devices 3 and air supply devices 4 installed in general housing 1 are divided into a plurality of groups. The total exhaust air volume set to general housing 1 is first distributed to each of the groups. Subsequently, within each group, the distributed exhaust air volume is further distributed to exhaust devices 3 included in the group. Moreover, ventilation control device 2 according to the second embodiment sets, for each group, the sum of the actual exhaust air volumes of exhaust devices 3 included in the group to the total air supply volume of the group, and distributes the total air supply volume set to the group to air supply devices 4 included in the group.

Accordingly, in the case of a building having a plurality of floors or closed spaces, the combinations of exhaust devices 3 and air supply devices 4 can be grouped for control for each floor or space, so that exhaust and air supply can be controlled within the group in a balanced manner. Accordingly, the air path design from the air supply space to the exhaust space in each floor or closed space can be facilitated.

In addition, since information change unit 53 is capable of changing the groups into which exhaust devices 3A to 3E and air supply devices 4A to 4E are divided, the air path design can be easily changed according to the floor of the building or the state of the closed space.

Additionally, ventilation control device 2 according to the second embodiment provides the same advantageous effects with the same configuration as ventilation control device 2 according to the first embodiment.

Third Embodiment

Next, ventilation control device 2 and ventilation system 40 according to a third embodiment will be described with reference to FIG. 17, FIG. 18, and FIG. 19. In ventilation control device 2 according to the first and second embodiments, the case has been described where the total exhaust air volume set to general housing 1 is distributed to a plurality of exhaust devices 3 installed, and the sum of the actual exhaust air volumes of exhaust devices 3 is set to the total air supply volume to be distributed to air supply devices 4, and is distributed to air supply devices installed. In contrast, in the third embodiment, the total air supply volume to be distributed to air supply devices 4 is set by the user, regardless of whether or not the total exhaust air volume is distributed to exhaust devices 3, and the set total air supply volume is distributed to air supply devices 4.

Hereinafter, ventilation control device 2 and ventilation system 40 according to the third embodiment will be described focusing on differences from ventilation control device 2 and ventilation system 40 according to the first and second embodiments. The structural elements which are the same as ventilation control device 2 and ventilation system 40 according to the first embodiment and the second embodiment share like reference signs, and description of such elements are omitted.

Figure 17:
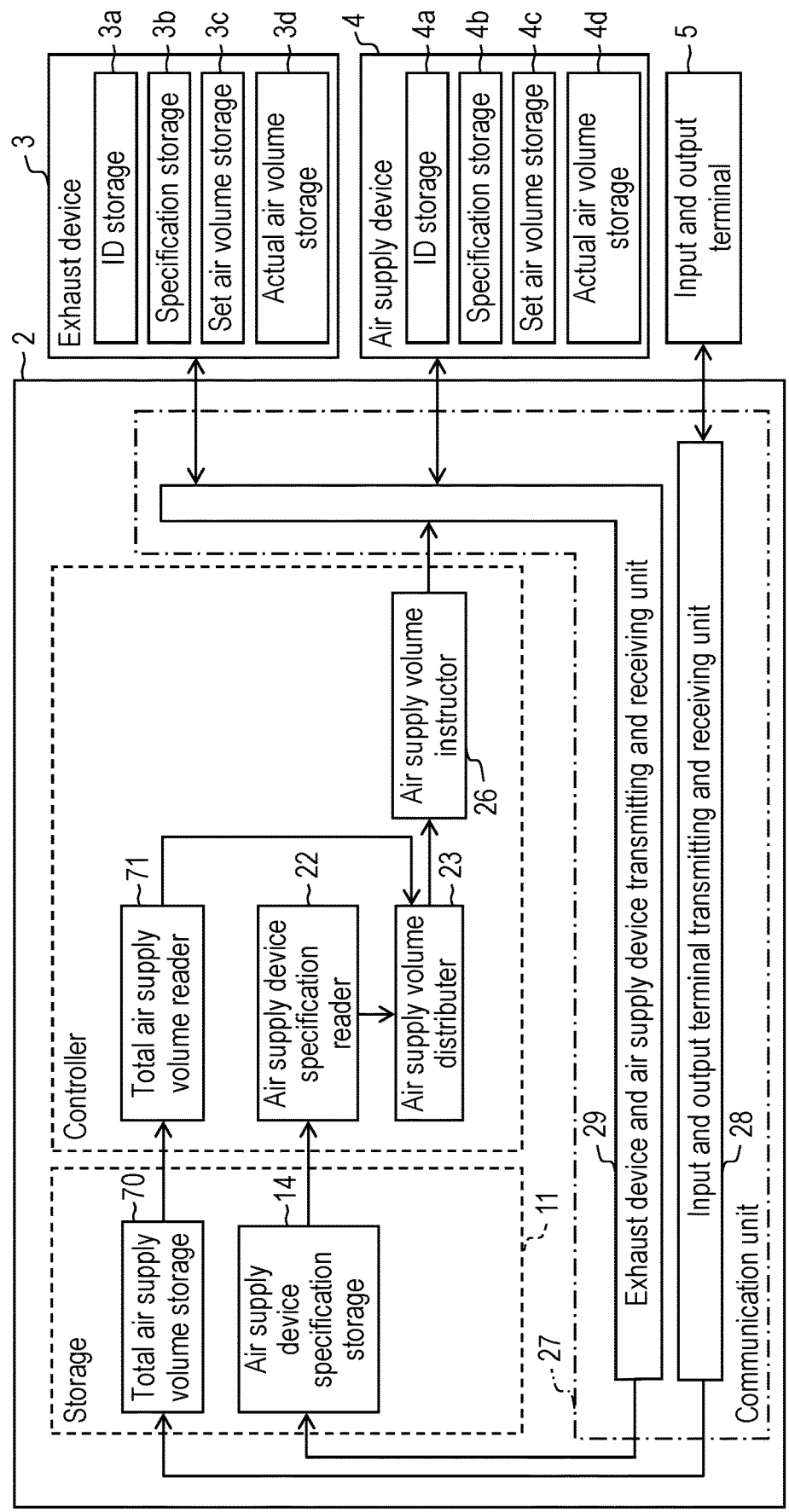
FIG. 17 is a schematic functional block diagram of a ventilation control device according to a third embodiment of the present disclosure.

FIG. 17 is a schematic functional block diagram of ventilation control device 2 according to the third embodiment. In FIG. 17, illustration of some structural elements which have already been described in the first embodiment and the second embodiment is omitted.

Figure 18:
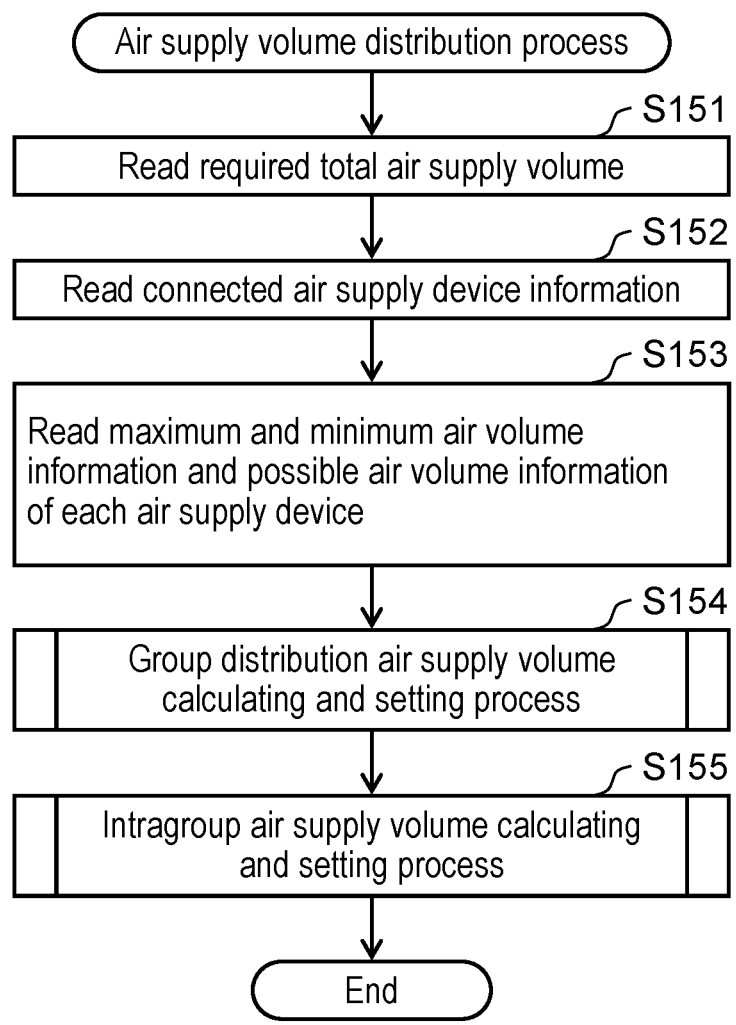
FIG. 18 is a flowchart of an air supply volume distribution process executed by the ventilation control device according to the third embodiment of the present disclosure.
Figure 19:
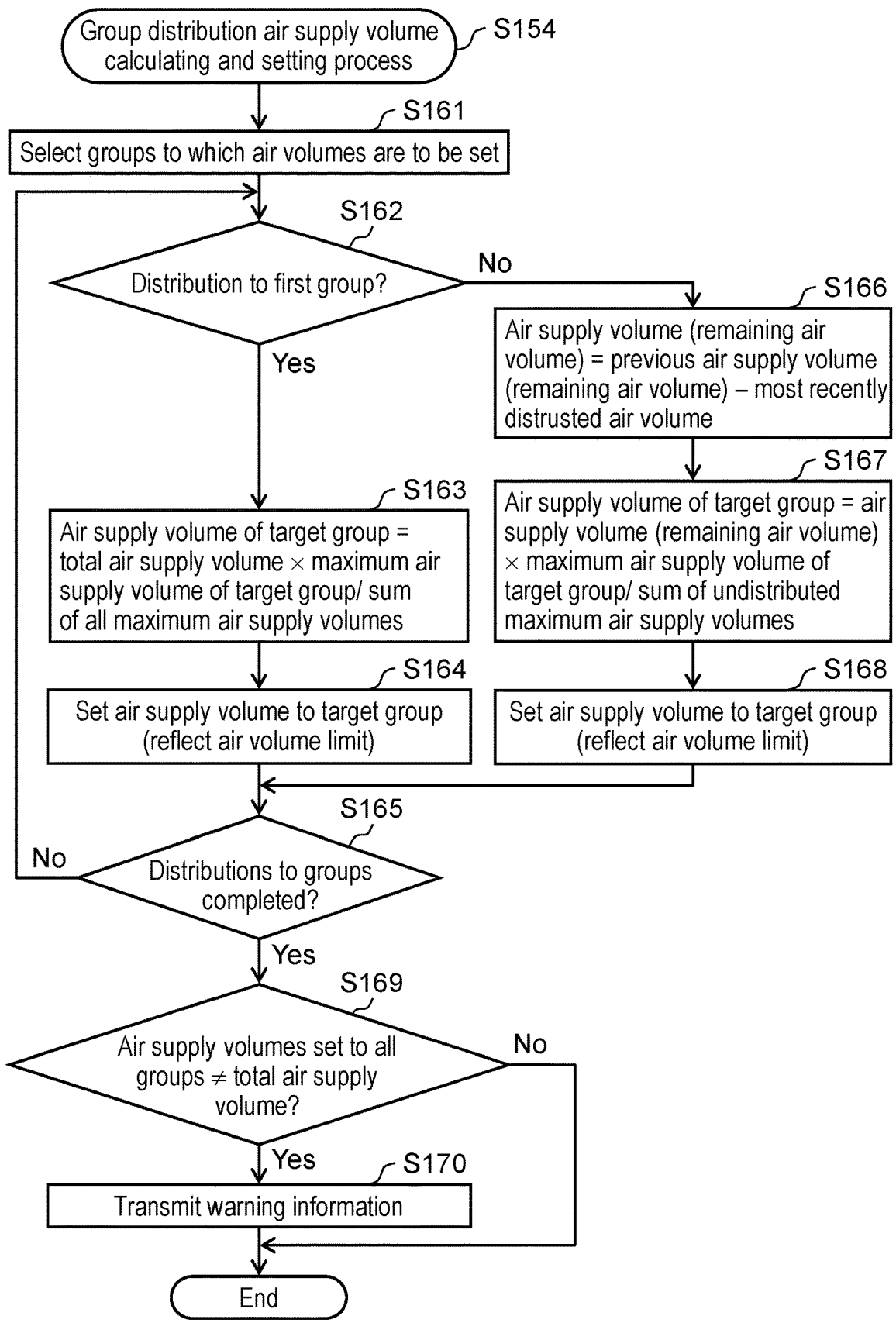
FIG. 19 is a flowchart of a group distribution air supply volume calculating and setting process executed by the ventilation control device.

FIG. 18 is a flowchart of an air supply volume distribution process executed by CPU 31 of ventilation control device 2 according to the third embodiment.

In the air supply volume distribution process, first, the required total air supply volume set to general housing 1 is read (S151). The total air supply volume is preset by the user through input and output terminal 5, and is stored in total air supply volume storage 70 of storage 11 via input and output terminal transmitting and receiving unit 28. In the processing in S151, the total air supply volume stored in total air supply volume storage 70 is read. The processing in S151 is executed by total air supply volume reader 71.

Next, processes similar to S43 and S44 in the first embodiment are executed in S152 and S153. Then, a group distribution air supply volume calculating and setting process is executed (S154).

Here, details of the group distribution air supply volume calculating and setting process (S154) will be described with reference to FIG. 19. FIG. 19 is a flowchart of the group distribution air supply volume calculating and setting process (S154). The group distribution air supply volume calculating and setting process (S154) is a process for distributing the total air supply volume set to general housing 1 to each group set by grouping unit 52.

The group distribution air supply volume calculating and setting process is the same as the group distribution exhaust air volume calculating and setting process according to the second embodiment illustrated in FIG. 13 except for the term "exhaust" being replaced with the term "air supply". In other words, the total air supply volume set by the user is distributed to each group in the third embodiment in the same manner as the distribution of the total exhaust air volume to each group in the second embodiment.

Description is continued referring back to FIG. 18. After the processing in S154, an intragroup air supply volume calculating and setting process is executed (S155). The intragroup air supply volume calculating and setting process (S155) is the same process as the intragroup air supply volume calculating and setting process (S74) (FIG. 13) in the second embodiment. After the intragroup air supply volume calculating and setting process (S155), the air supply volume distribution process ends.

As described above, in ventilation control device 2 and ventilation system 40 according to the third embodiment, the air supply volume of each air supply device 4 is set by distributing the total air supply volume set to general housing 1 according to the maximum air supply volume of each air supply device 4. Hence, the air supply volume is set in a balanced manner according to the capacity of each air supply device 4. Accordingly, energy saving operation of ventilation system 40 can be achieved.

In particular, in ventilation control device 2 and ventilation system 40 according to the third embodiment, a plurality of air supply devices 4 installed in general housing 1 are divided into a plurality of groups, and the total air supply volume set by the user is distributed to each group. In each group, the distributed air supply volume is further distributed to air supply devices 4 included in the group. Accordingly, in the case of a building with a plurality of floors or closed spaces, the combinations of exhaust devices 3 and air supply devices 4 can be grouped for control for each floor or space. This facilitates the air path design from the air supply space to the exhaust space in each floor or closed space.

Although the present disclosure has been described based on the above embodiments, the present disclosure is not limited to the above-described embodiments. Various improvements and modifications can be easily conceived without departing from the gist of the present disclosure. For example, each embodiment may be modified by additionally including one or more structural elements of another embodiment or by replacing with one or more structural elements of another embodiment. Moreover, the numerical values mentioned in each of the above described embodiments are examples, and it is, of course, possible to employ other numerical values.

In the first and second embodiments described above, the case has been described where the exhaust air volumes are distributed to exhaust devices 3 and the air supply volumes are distributed to air supply devices 4. However, only the exhaust air volumes may be distributed to exhaust devices 3. Accordingly, since the exhaust air volumes are set in a balanced manner according to the capacity of each exhaust device 3, the energy saving operation of ventilation system 40 can be achieved.

In the third embodiment, the case has been described where air supply devices 4 installed in general housing 1 are divided into a plurality of groups, the total air supply volume set by the user is distributed to each group, and within each group, the distributed air supply volume is further distributed to air supply devices 4 included in the group. In contrast, in a similar manner to the first embodiment, it may be that without dividing air supply devices 4 installed in general housing 1 into groups, the total air supply volume set by the user is distributed according to the maximum air supply volume of each air supply device 4. This also allows the air supply volumes to be set in a balanced manner according to the capacity of each air supply device 4, leading to the energy saving operation of ventilation system 40.

INDUSTRIAL APPLICABILITY

The ventilation control device and the ventilation system according to the present disclosure allow energy-saving operations to be performed, and therefore are applicable to houses or multiunit residence such as apartments.

REFERENCE MARKS IN THE DRAWINGS 1 general housing
2 ventilation control device
3 exhaust device
3a ID storage
3b specification storage
3c set air volume storage
3d actual air volume storage
3A exhaust device
3B exhaust device
3C exhaust device
3D exhaust device
3E exhaust device
4 air supply device
4a ID storage
4b specification storage
4c set air volume storage
4d actual air volume storage
4A air supply device
4B air supply device
4C air supply device
4D air supply device
4E air supply device
5 input and output terminal
6A air path
6B air path
6C air path
6D air path
6E air path
6F air path
11 storage
12 total exhaust air volume storage
13 exhaust device specification storage
14 air supply device specification storage
15 controller
16 total exhaust air volume reader
17 exhaust device specification reader
18 exhaust air volume distributer
18a group exhaust air volume distributer
18b individual exhaust air volume distributer
19 exhaust air volume instructor
20 notification processor
21 capacity adjuster
22 air supply device specification reader
23 air supply volume distributer
24 total air supply volume setting unit
25 actual exhaust air volume obtaining unit
26 air supply volume instructor
27 communication unit
28 input and output terminal transmitting and receiving unit
29 exhaust device and air supply device transmitting and receiving unit
31 CPU
32 RAM
33 ROM
34 data flash memory
35 wireless communication module
36 internal bus
40 ventilation system
51 group information storage
52 grouping unit
53 information change unit
60 actual exhaust air volume integrator
70 total air supply volume storage
71 total air supply volume reader

The invention claimed is:
1. A ventilation control device communicatively connected to a plurality of exhaust devices installed in a building, the ventilation control device controlling an opera- tion of each of the plurality of exhaust devices capable of delivering air from an inside to an outside of the building, the ventilation control device comprising:
- a total exhaust air volume reader which reads a total exhaust air volume set to the building;
- an exhaust device specification reader which reads a maximum exhaust air volume of each of the plurality of exhaust devices as a specification of the exhaust device;
- an exhaust air volume distributer which sets an exhaust air volume of each of the plurality of exhaust devices by distributing the total exhaust air volume read by the total exhaust air volume reader according to the maximum exhaust air volume of the exhaust device read by the exhaust device specification reader; and
- an exhaust air volume instructor which instructs, to each of the plurality of exhaust devices, the exhaust air volume set by the exhaust air volume distributor.

2. The ventilation control device according to claim 1,
wherein the ventilation control device is communicatively connected to a plurality of air supply devices installed in the building, the ventilation control device controlling an operation of each of the plurality of air supply devices capable of delivering air from the outside to the inside of the building, and
the ventilation control device further comprises:
- an actual exhaust air volume obtaining unit which obtains an actual exhaust air volume from each of the plurality of exhaust devices, the actual exhaust air volume being a volume of air actually exhausted by the exhaust device;
- a total air supply volume setting unit which sets, to a total air supply volume, a sum of the actual exhaust air volumes of the plurality of exhaust devices obtained by the actual exhaust air volume obtaining unit, the total air supply volume being a total volume of air to be supplied to the building;
- an air supply device specification reader which reads a maximum air supply volume of each of the plurality of air supply devices as a specification of the air supply device;
- an air supply volume distributor which sets an air supply volume of each of the plurality of air supply devices by distributing the total air supply volume set by the total air supply volume setting unit according to the maximum air supply volume of the air supply device read by the air supply device specification reader; and
- an air supply volume instructor which instructs, to each of the plurality of air supply devices, the air supply volume set by the air supply volume distributor.

3. The ventilation control device according to claim 2, further comprising:
- a grouping unit which divides the plurality of exhaust devices and the plurality of air supply devices into a plurality of groups,
wherein the exhaust air volume distributor includes:
- a group exhaust air volume distributor which sets an exhaust air volume of each of the plurality of groups divided by the grouping unit, by distributing the total exhaust air volume read by the total exhaust air volume reader according to a sum of the maximum exhaust air volumes of exhaust devices included in the group; and
- an individual exhaust air volume distributor which sets, for each of the plurality of the groups, the exhaust air volume of each of the exhaust devices included in the group, by distributing the exhaust air volume of the group set by the group exhaust air volume distributer according to the maximum exhaust air volume of each of the exhaust devices included in the group, the total air supply volume setting unit sets, for each of the plurality of groups divided by the grouping unit, a total air supply volume of the group according to a sum of the actual exhaust air volumes of the exhaust devices included in the group, and
the air supply volume distributor sets, for each of the plurality of groups, the air supply volume of each of air supply devices included in the group, by distributing the total air supply volume of the group set by the total air supply volume setting unit according to the maximum air supply volume of each of the air supply devices included in the group.

4. The ventilation control device according to claim 3, further comprising:
- a group information storage which stores information indicating a correspondence relationship between (i) the plurality of exhaust devices and the plurality of air supply devices and (ii) the plurality of groups of the plurality of exhaust devices or the plurality of air supply devices; and
- an information change unit which receives a change of a group of one exhaust device or one air supply device, and changes the information stored in the group information storage according to the change received.

5. The ventilation control device according to claim 2,
wherein, when the air supply volume of one air supply device set by the distribution exceeds the maximum air supply volume of the one air supply device, the air supply volume distributor sets the maximum air supply volume of the one air supply device to the air supply volume of the one air supply device.

6. The ventilation control device according to claim 2,
wherein the air supply device specification reader reads a minimum air supply volume of each of the plurality of air supply devices as the specification of the air supply device, and
when the air supply volume of one air supply device set by the distribution is less than the minimum air supply volume of the one air supply device, the air supply volume distributor sets the minimum air supply volume of the one air supply device to the air supply volume of the one air supply device.

7. The ventilation control device according to claim 1, further comprising:
- a grouping unit which divides the plurality of exhaust devices into a plurality of groups,
wherein the exhaust air volume distributor includes:
- a group exhaust air volume distributor which sets an exhaust air volume of each of the plurality of groups divided by the grouping unit, by distributing the total exhaust air volume read by the total exhaust air volume reader according to a sum of the maximum exhaust air volumes of exhaust devices included in the group; and
- an individual exhaust air volume distributor which sets, for each of the plurality of groups, the exhaust air volume of each of the exhaust devices included in the group, by distributing the exhaust air volume of the group set by the group exhaust air volume distributor according to the maximum exhaust air volume of each of the exhaust devices included in the group.

8. The ventilation control device according to claim 7, further comprising:
- a group information storage which stores information indicating a correspondence relationship between the plurality of exhaust devices and the plurality of groups of the plurality of exhaust devices; and an information change unit which receives a change of a group of one exhaust device, and changes the information stored in the group information storage according to the change received.

9. The ventilation control device according to claim 1, wherein, when the exhaust air volume of one exhaust device set by the distribution exceeds the maximum exhaust air volume of the one exhaust device, the exhaust air volume distributer sets the maximum exhaust air volume of the one exhaust device to the exhaust air volume of the one exhaust device.

10. The ventilation control device according to claim 1, wherein the exhaust device specification reader reads a minimum exhaust air volume of each of the plurality of exhaust devices as the specification of the exhaust device, and when the exhaust air volume of one exhaust device set by the distribution is less than the minimum exhaust air volume of the one exhaust device, the exhaust air volume distributor sets the minimum exhaust air volume of the one exhaust device to the exhaust air volume of the one exhaust device.

11. The ventilation control device according to claim 1, further comprising:

a notification processor which executes a process for making a notification when a sum of the exhaust air volumes of the plurality of exhaust devices distributed by the exhaust air volume distributor is less than the total exhaust air volume read by the total exhaust air volume reader.

12. The ventilation control device according to claim 1, further comprising:

a notification processor which executes a process for making a notification when a sum of the exhaust air volumes of the plurality of exhaust devices distributed by the exhaust air volume distributor exceeds the total exhaust air volume read by the total exhaust air volume reader.

13. The ventilation control device according to claim 1, further comprising:

an actual exhaust air volume obtaining unit which obtains, from each of the plurality of exhaust devices, an actual exhaust air volume which is a volume of air actually exhausted by the exhaust device;

an actual exhaust air volume integrator which calculates an integrated air volume by integrating the actual exhaust air volume of each of the plurality of exhaust devices obtained by the actual exhaust air volume obtaining unit; and a capacity adjuster which adjusts the exhaust air volume of each of the plurality of exhaust devices according to the integrated air volume calculated by the actual exhaust air volume integrator and a volume of air required to be exhausted per a predetermined length of time.

14. The ventilation control device according to claim 13, wherein the capacity adjuster instructs each of the plurality of exhaust devices to stop operating when the integrated air volume calculated by the actual exhaust air volume integrator reaches the volume of air required to be exhausted per the predetermined length of time.

15. A ventilation system, comprising:

a plurality of exhaust devices installed in a building, and capable of delivering air from an inside to an outside of the building;

a plurality of air supply devices installed in the building, and capable of delivering air from the outside to the inside of the building; and the ventilation control device according to claim 1, the ventilation control device being communicatively connected to the plurality of exhaust devices and the plurality of air supply devices.

16. A ventilation control device communicatively connected to a plurality of air supply devices installed in a building, the ventilation control device controlling an operation of each of the plurality of air supply devices capable of delivering air from an outside to an inside of the building, the ventilation control device comprising:

a total air supply volume reader which reads a total air supply volume set to the building;

an air supply device specification reader which reads a maximum air supply volume of each of the plurality of air supply devices as a specification of the air supply device;

an air supply volume distributer which sets an air supply volume of each of the plurality of air supply devices by distributing the total air supply volume read by the total air supply volume reader according to the maximum air supply volume of the air supply device read by the air supply device specification reader; and an air supply volume instructor which instructs, to each of the plurality of air supply devices, the air supply volume set to the air supply device by the air supply volume distributer.

* * * * *